US009112839B2

(12) United States Patent
Richardson et al.

(10) Patent No.: US 9,112,839 B2
(45) Date of Patent: Aug. 18, 2015

(54) METHODS AND APPARATUS FOR EFFICIENT WIRELESS COMMUNICATION OF FILE INFORMATION

(71) Applicant: QUALCOMM Incorporated, San Diego, CA (US)

(72) Inventors: Thomas Joseph Richardson, South Orange, NJ (US); Xinzhou Wu, Hillsborough, NJ (US); Junyi Li, Chester, NJ (US); Sundar Subramanian, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 13/726,076

(22) Filed: Dec. 22, 2012

(65) Prior Publication Data

US 2014/0181246 A1 Jun. 26, 2014

(51) Int. Cl.
H04L 29/08 (2006.01)
H04W 28/02 (2009.01)
H04B 7/02 (2006.01)
H04L 1/00 (2006.01)
H04W 84/18 (2009.01)

(52) U.S. Cl.
CPC ............... *H04L 67/06* (2013.01); *H04B 7/026* (2013.01); *H04L 67/18* (2013.01); *H04L 67/2842* (2013.01); *H04W 28/021* (2013.01); *H04W 28/0226* (2013.01); *H04L 1/0076* (2013.01); *H04W 84/18* (2013.01)

(58) Field of Classification Search
CPC ..... H04L 1/0076; H04L 67/06; H04L 1/1867; H04L 1/189; H04B 7/026; H04B 7/15521; H04W 84/18; H04W 28/021; H04W 28/0226
See application file for complete search history.

(56) References Cited

U.S. PATENT DOCUMENTS 6,970,939 B2  11/2005  Sim
2008/0089333 A1*  4/2008  Kozat et al. .................. 370/390
(Continued)

OTHER PUBLICATIONS

Chachulski S., et al., "Trading Structure for Randomness in Wireless Opportunistic Routing", Proceedings of the 2007 conference on Applications, technologies, architectures, and protocols for computer communications [Online] 2007, pp. 169-180.

(Continued)

*Primary Examiner* — Alex Skripnikov
*Assistant Examiner* — Nicole E King
(74) *Attorney, Agent, or Firm* — James K. O'Hare

(57) ABSTRACT

Efficient methods for wirelessly communicating file content under varying conditions are described. A wireless device determines, based on mobility and/or geographic location, if the wireless device is to operate in a first mode of communication operation in which received portions of said file are re-transmitted or a second mode of communication operation in which combinations of portions of said file are transmitted. The wireless device transmits packets communicating received file portions when it is determined that the wireless device is to operate in said first mode of operation and transmits packets communicating combinations of file portions, e.g., linear combinations of file portions, when it is determined that the wireless device is to operate in said second mode of operation. The contents of a file may be obtained from some packets which communicate distinct portions of the file and other packets which communicate combinations of distinct portions of the file.

16 Claims, 14 Drawing Sheets

(56) References Cited

U.S. PATENT DOCUMENTS

| | | |
|---|---|---|
| 2009/0279462 A1 | 11/2009 | Luo et al. |
| 2010/0008288 A1* | 1/2010 | Taori et al. ............ 370/315 |
| 2010/0220644 A1* | 9/2010 | Reznik et al. ............ 370/315 |
| 2011/0103402 A1* | 5/2011 | Achir ............ 370/474 |
| 2011/0164562 A1 | 7/2011 | Qiu et al. |
| 2011/0299526 A1* | 12/2011 | Wu et al. ............ 370/390 |
| 2012/0155348 A1 | 6/2012 | Jacobson |
| 2012/0188934 A1 | 7/2012 | Liu et al. |
| 2013/0065620 A1* | 3/2013 | Jovicic et al. ............ 455/500 |
| 2014/0146916 A1* | 5/2014 | Shattil ............ 375/295 |

OTHER PUBLICATIONS

Chin T.L., et al., "Network Coded File Sharing in Vehicular Ad-Hoc Networks", Wireless Personal Multimedia Communications (WPMC), 2012 15th International Symposium on, IEEE, Sep. 24, 2012, pp. 60-64, XP032294310, ISBN: 978-1-4673-4533-0.

International Search Report and Written Opinion—PCT/US2013/077113—ISA/EPO—May 19, 2014.

Lee C., et al., "Efficient peer-to-peer file sharing using network coding in MANET,'" Journal of Communications and Networks, New York, NY, USA,IEEE, US, vol. 10, No. 4, Dec. 1, 2008, pp. 422-429, XP011483604, ISSN: 1229-2370, DOI: 10.1109/JCN.2008.6389858.

\* cited by examiner

METHODS AND APPARATUS FOR EFFICIENT WIRELESS COMMUNICATION OF FILE INFORMATION

FIELD

Various embodiments relate to wireless communications and, more particularly, to methods and apparatus for efficiently communicating files which are partitioned into file portions.

BACKGROUND

In wireless networks in which wireless devices are included in or used in vehicles, there may be highly varying topologies and/or conditions experienced over time. For many applications, it may be desirable to wirelessly communicate a relatively large file to a wireless device in a vehicle where the air link resources are limited. During some times, a vehicle may be static for an extended period of time, while during other times a vehicle may be in motion. In addition, some geographic locations may be more favorable than others for communicating the file, e.g., due to proximity to a base station or other device which is broadcasting the file on a recurring basis. A vehicle may not be able to remain in the vicinity of a base station long enough to recover an entire file.

A simple approach is for a wireless device, which has received some portions of a file to rebroadcast the file portions that it has received, regardless of the conditions or environment. Thus over time, wireless devices may acquire complete files by piecing together received file portions transmitted from base stations and re-transmitted from other wireless devices. However, simple rebroadcast of received file portions may tend to result in redundant file portion transmissions, and may prolong the time until a wireless device acquires a complete file, particularly in a highly dynamic environment.

Based on the above discussion, there is a need for new methods and apparatus to efficiently communicate a file in a varying environment including mobility.

SUMMARY

Various embodiments describe a method of communicating file information which uses different approaches to communicate information as a function of mobility and/or geographic location. For example, in one embodiment, in a static environment, a vehicle's wireless device rebroadcasts packets including file portions that have been received earlier, but in a mobile scenario, the vehicle's wireless device transmits packets that include combinations, e.g., linear combinations, of file portions. At a given time, different wireless devices may have different sets of received file portions and/or different sets of received and/or generated combinations. Since different moving wireless devices will tend to transmit different combinations, e.g., different linear combinations, a receiving wireless device is likely to obtain at least some new information from a received packet. The case of receiving at least some new information from a packet is in contrast to the case where a receiving wireless device simply receives a copy of a packet which it previously received and thus obtains no new information from the packet for completing collection of the contents of the file.

In accordance with an aspect of some embodiments, the contents of a file may be, and sometimes are, obtained from some packets which communicate distinct portions of a file and other packets which communicate combinations, e.g., linear combinations, of distinct portions of a file. In some embodiments, a wireless device transmits packets communicating linear combinations of distinct packet portions when operating in a mobile state of operation and packets communicating distinct packet portions when operating in a static mode of operation or when in a geographic region where a predetermined packet distribution structure between nodes in the geographic area is known thereby reducing the risk of multiple transmissions of the same packet portions to the same nodes.

An exemplary method of operating a wireless device to communicate a file, in accordance with some embodiments includes determining if the wireless device is to operate in a first mode of communication operation in which received portions of said file are transmitted or a second mode of communication operation in which combinations of portions of said file are transmitted. In some such embodiments, at least one of said combinations of file portions includes fewer bits than a number of input bits used to generate said at least one combination of file portions. The exemplary method further includes transmitting packets communicating received file portions if it is determined that the wireless device is to operate in said first mode of operation and transmitting packets communicating combinations of file portions if it is determined that the wireless device is to operate in said second mode of operation.

An exemplary wireless device, in accordance with some embodiments, includes at least one processor configured to determine if the wireless device is to operate in a first mode of communication operation in which received portions of a file are transmitted or a second mode of communication operation in which combinations of portions of said file are transmitted, at least one of said combinations of file portions including fewer bits than a number of input bits used to generate said at least one combination of file portions. The at least one processor is further configured to transmit packets communicating received file portions if it is determined that the wireless device is to operate in said first mode of operation and transmit packets communicating combinations of file portions if it is determined that the wireless device is to operate in said second mode of operation. The exemplary wireless device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
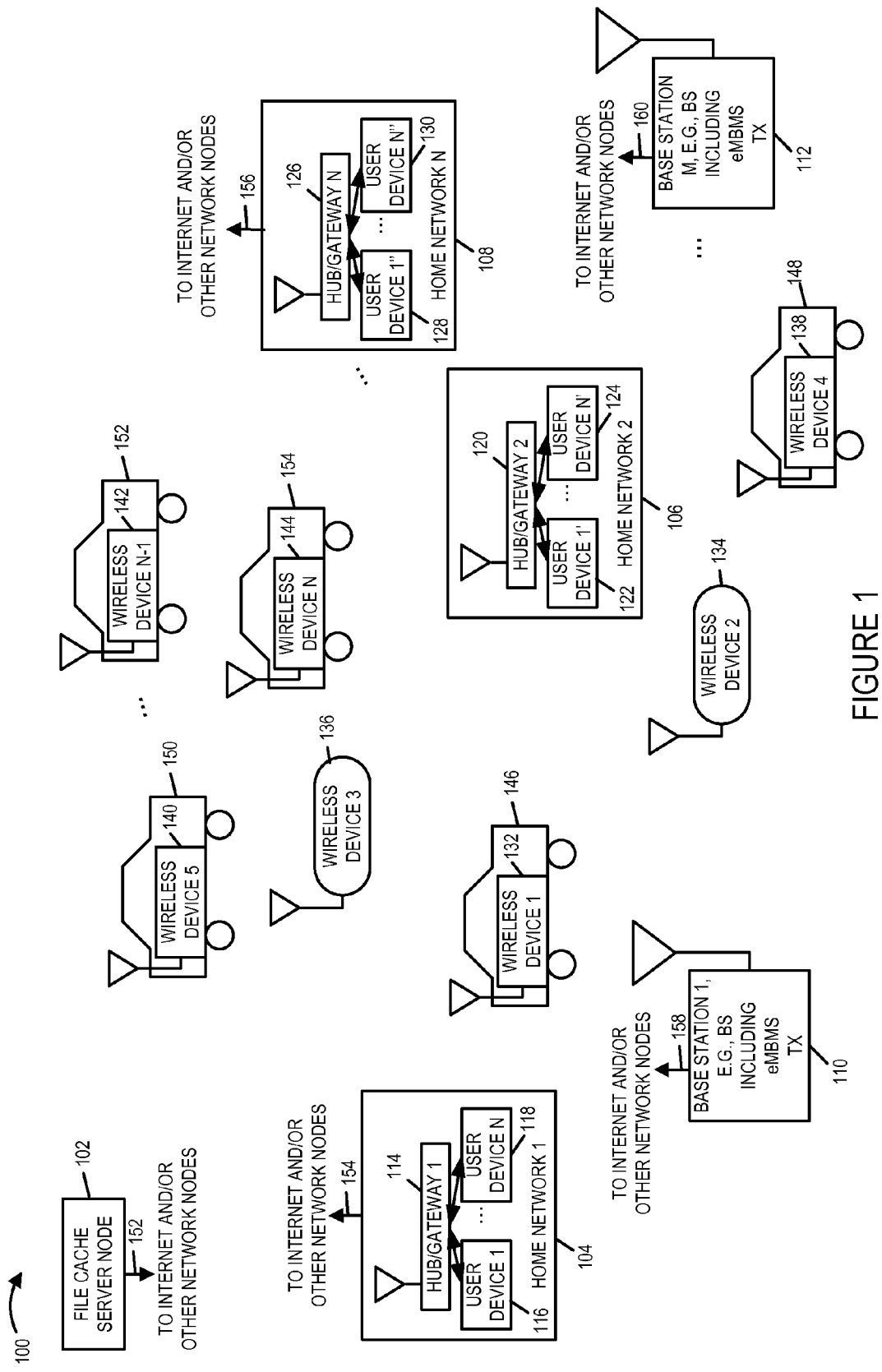
FIG. 1 is a drawing of an exemplary wireless communications system in accordance with various embodiments.

FIG. 1 is a drawing of an exemplary wireless communications system 100 in accordance with various exemplary embodiments. Wireless system 100 includes a file cache server node 102, a plurality of home networks (home network 1 104, home network 2 106, . . . , home network N 108), a plurality of base stations (base station 1 110, . . . , base station M 112), and a plurality of wireless devices (wireless device 1 132, wireless device 2 134, wireless device 3 136, wireless device 4 138, wireless device N–1 142, wireless device N 144). File cache server node 102 includes a plurality of files, and each file includes a plurality of file portions. Exemplary files stored on file cache server node 102 include video files, audio files and audio/video files. File cache server node 102 is coupled to the Internet and/or other network nodes via link 152.

Each home network includes a hub/gateway device which is coupled to a plurality of user devices. The hub/gateway device supports wireless communications with wireless devices which are in the vicinity of the hub/gateway device. The user devices include, e.g., phones, electronic tablets, electronic pads, audio output devices, video output devices, and audio/video output devices. A user device may be used to replay an acquired file. Home network 1 104 includes hub/gateway 1 114 coupled to user devices (user device 1 116, . . . , user device N 118). Home network 2 106 includes hub/gateway 2 120 coupled to user devices (user device 1' 122, . . . , user device N' 124). Home network N 108 includes hub/gateway N 126 coupled to user devices (user device 1" 128, . . . , user device N" 130). Some of the home networks are coupled to the Internet and/or other network nodes. Home network 1 104 is coupled to the Internet and/or other network nodes via link 154, via which home network 1 104 may, and sometimes does, obtain portions of a file to be transmitted, e.g., broadcast, to wireless devices in its vicinity. Home network N 108 is coupled to the Internet and/or other network nodes via link 156, via which home network N 108 may, and sometimes does, obtain portions of a file to be transmitted, e.g., broadcast, to wireless devices in its vicinity.

Home networks (104, 106, . . . , 108) can, and sometimes do, also receive, via wireless signals, a set of file portions corresponding to a file which has been acquired by a wireless device. Some home networks, e.g., home network 106, are able to receive an acquired file from a wireless device which would otherwise not be available to the home network since the home network lacks a backhaul link or access to the file cache server node 102.

The base stations (base station 1 110, . . . , base station M 112) are, e.g., base stations including an Evolved Multicast Broadcast Multimedia Services (eMBMS) transmitter. The base stations (110, . . . , 112) are coupled to the Internet and/or other network nodes via links (158, . . . , 160), respectively, via which the base stations may, and sometimes do receive portions of a file from file cache server node 102, and the received file portions are transmitted, e.g., broadcast, by the base station for wireless devices which may be in the vicinity of the base station. In various embodiments, the home networks and/or base stations are widely dispersed, e.g., with large areas in the system 100 in which a wireless device is unable to receive a file portion from one of the base station or home networks wireless transmitters.

The wireless devices (wireless device 1 132, wireless device 2 134, wireless device 3 136, wireless device 4 138, wireless device 5 140, wireless device N–1 142, . . . , wireless device N 144) are mobile wireless devices. Some of the wireless devices, e.g., wireless device 1 132, wireless device 4 148, wireless device 5 140, wireless device N–1 143, wireless device N 144 are located in a vehicle, e.g., vehicles (146, 148, 150, 152, 154), respectively. Some such wireless devices are embedded within the vehicle.

Wireless devices (132, 134, 136, 138, 140, 142, . . . , 144) may, and sometimes do, receive signals, e.g., packets conveying file portions. Wireless devices (132, 134, 136, 138, 140, 142, . . . , 144) may, and sometimes do receive signals, e.g., packets conveying combinations of file portions, e.g., linear combinations of file portions. Wireless devices (132, 134, 136, 138, 140, 142, . . . , 144) may, and sometimes do generate combinations of file portions, e.g., linear combinations of file portions. In some embodiments, during a first mode of operation a wireless device, e.g. wireless device 1 132, transmits a received file portion. In some embodiments, during a second mode of operation a wireless device, e.g. wireless device 1 132, transmits a combination of file portions. In some embodiments, the wireless device, e.g., wireless device 1 132, determines the mode of operation based on one or more of: motion of the wireless device or geographic location of the wireless device.

A wireless device, e.g., wireless device 1 132, acquires a complete file using one or more received file portions and/or received combinations of file portions. Received combinations of file portions may be, and sometimes are used by the wireless device to solve for file portions which were not received directly. When a wireless device, e.g., wireless device 1 132, acquires a complete file, the file content, e.g., video, audio, or video/audio content, may be, and sometimes is, consumed, e.g., played, by a user of the wireless device, e.g., within the vehicle. When a wireless device, e.g., wireless device 1 132 acquires a complete file, the file content, e.g., video, audio, or video/audio content, may be, and sometimes is wirelessly transmitted to a home network, e.g., home network 2 106, to a hub/gateway device, e.g. hub/gateway 2 120, to be consumed, e.g., played, by a user of a user device, e.g. user device 1' 122 at the home network 106.

Figures 2, 2A, 2B, 2C:
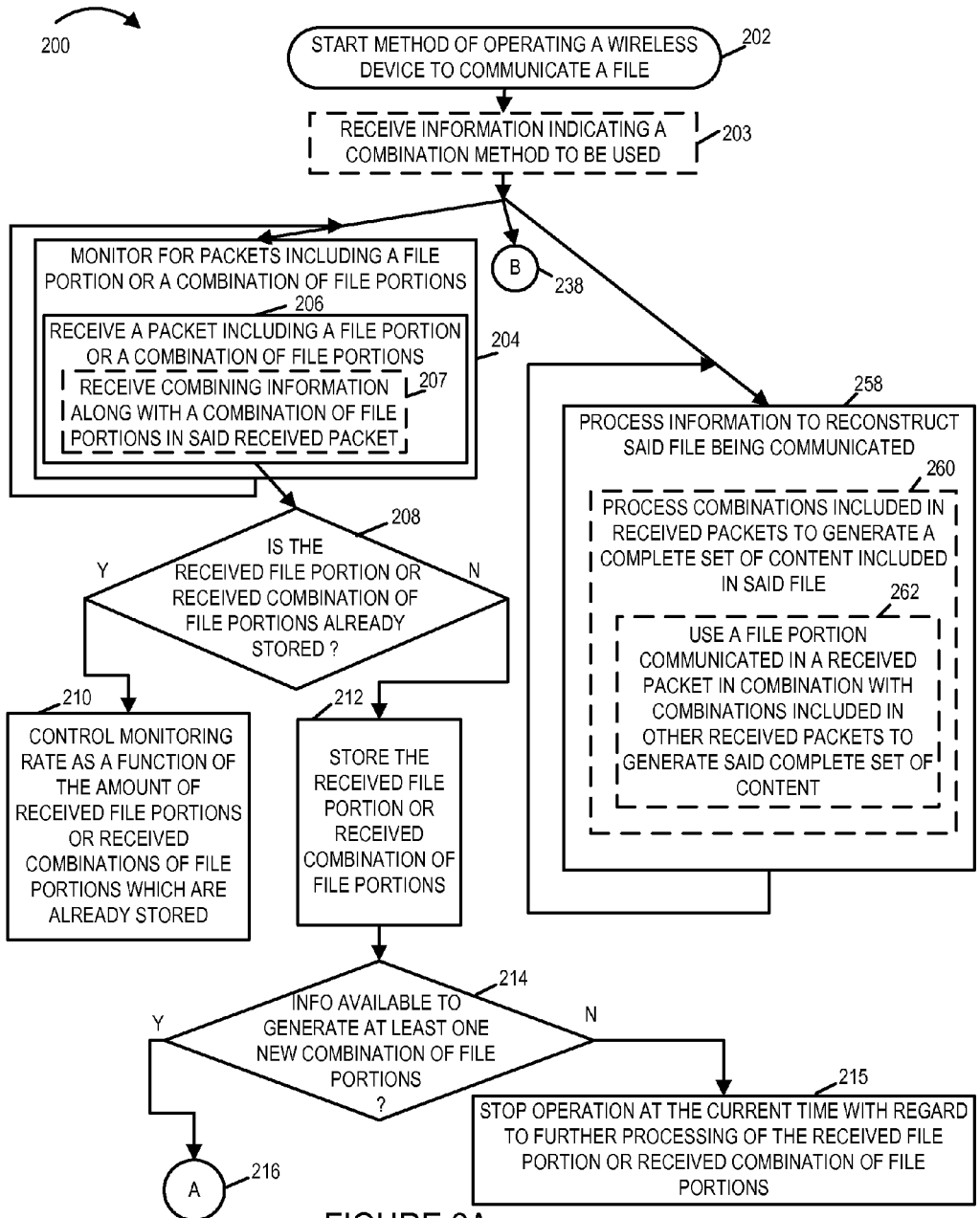
FIG. 2A is a first part of a flowchart of an exemplary method of operating a wireless device to communicate a file, in accordance with various exemplary embodiments.
FIG. 2B is a second part of a flowchart of an exemplary method of operating a wireless device to communicate a file, in accordance with various exemplary embodiments.
FIG. 2C is a third part of a flowchart of an exemplary method of operating a wireless device to communicate a file, in accordance with various exemplary embodiments.
Figure 2B:
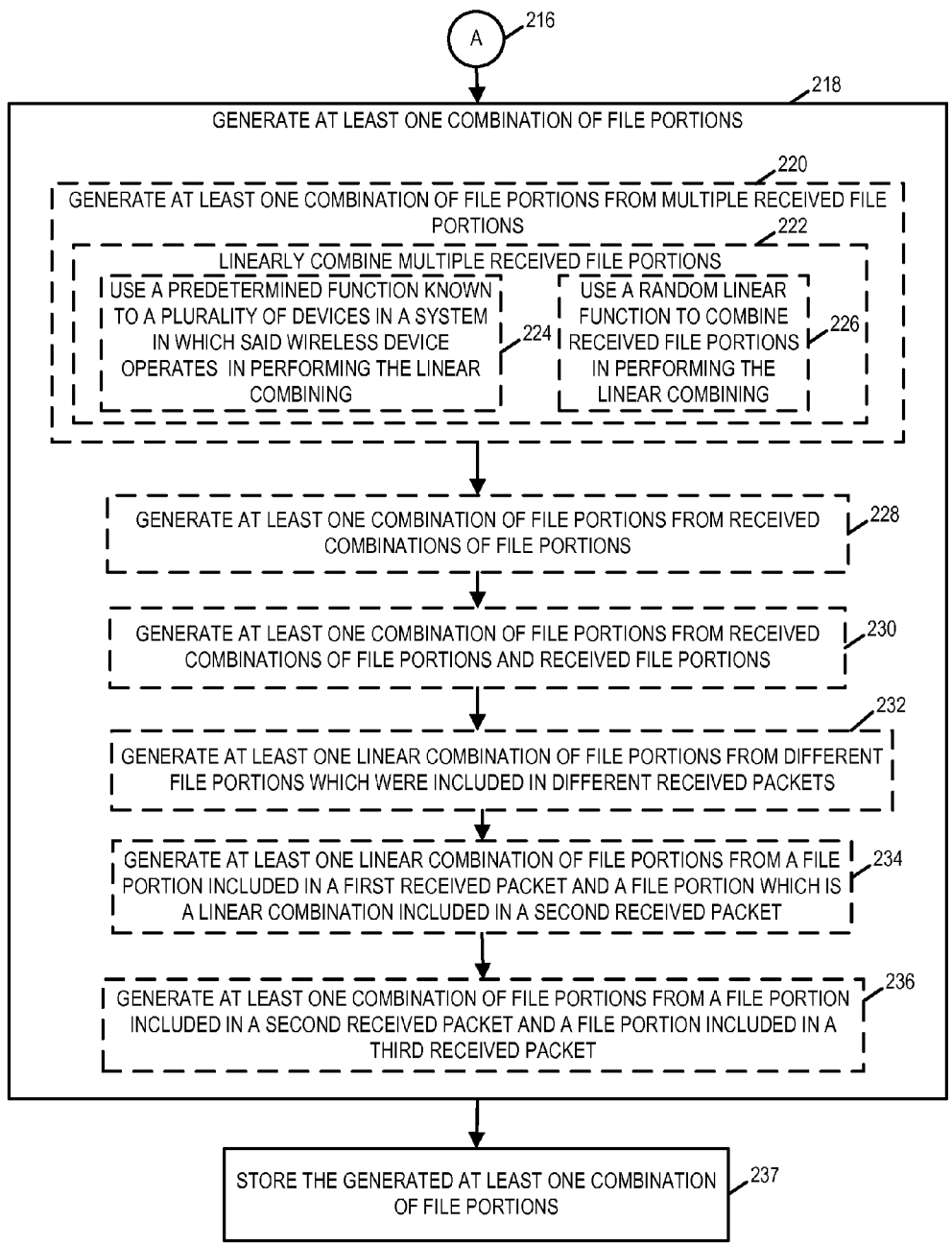
Figure 2C:
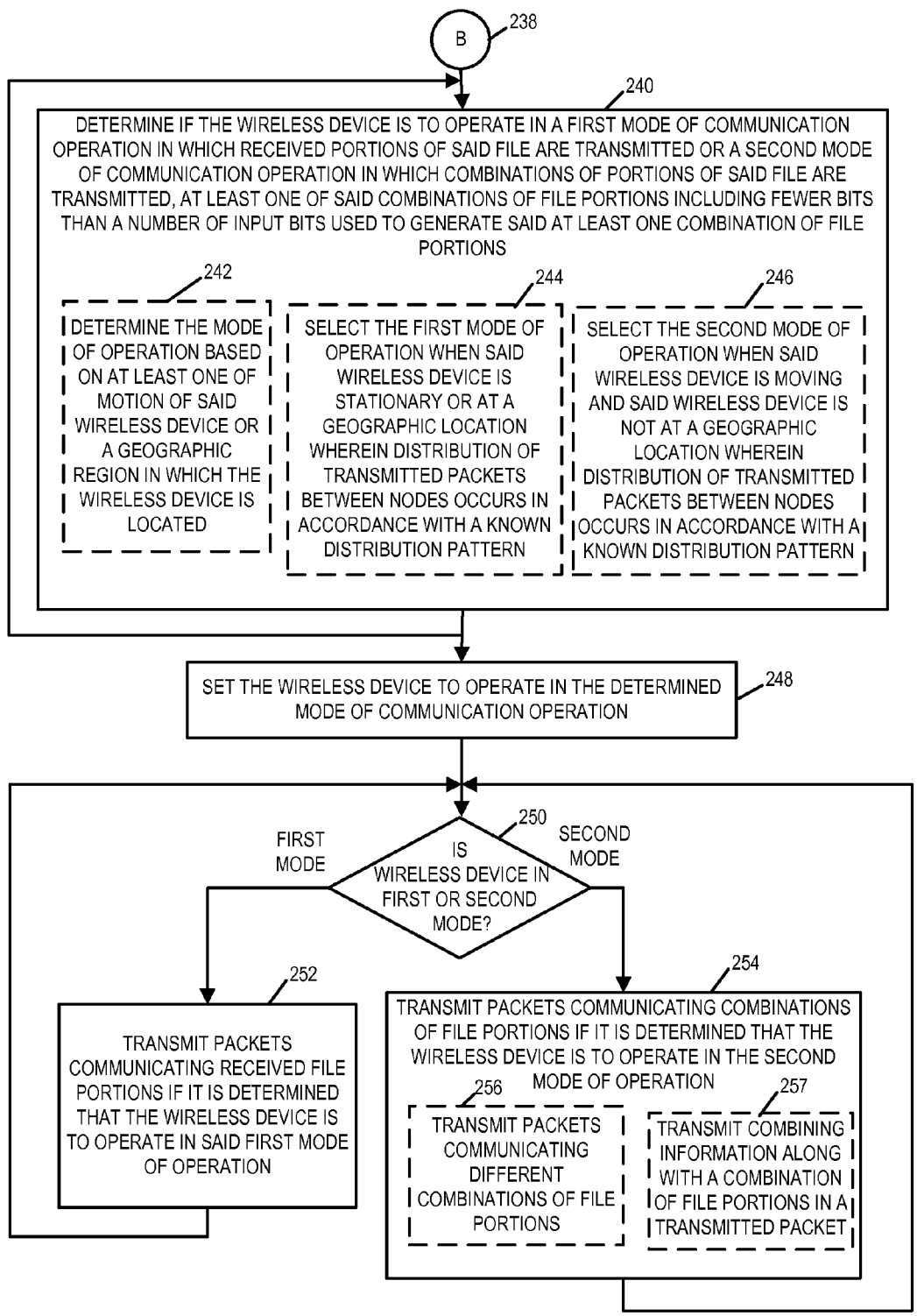

FIG. 2, comprising the combination of FIG. 2A, FIG. 2B, and FIG. 2C, is a flowchart 200 of an exemplary method of operating a wireless device to communicate a file, in accordance with various exemplary embodiments.

Operation starts in step 202, where the wireless device is powered on and initialized. In some embodiments, e.g., an embodiment wherein a file portion combining method is preconfigured in the wireless device or an embodiment in which combining information is communicated along with communicated combined file portions, operation proceeds, from step 202 to step 204, to step 240 via connecting node B 238, and to step 258. In some other embodiments, operation proceeds from step 202 to step 203, in which the wireless device receives information indicating a combination method to be used by the wireless device for combining file portions. Operation proceeds, from step 203 to step 204, to step 240 via connecting node B 238, and to step 258.

Returning to step 204, in step 204 the wireless device monitors for packets including a file portion or a combination of file portions. Step 204 is performed repeatedly on an ongoing basis. Step 204, may, and sometimes does, include step 206, in which the wireless device receives a packet including a file portion or combination of file portions. In some embodiments, if the received packet includes a combination of file portions step 204 includes step 207, in which the wireless device receives combining information along with a combination of file portions in said received packet. In some such embodiments, the combining information is included in a header of the packet. Operation proceeds from step 206 to step 208 for each received file portion or received combination of file portions. In step 208, the wireless device determines whether or not the received file portion or received combination of file portions is already stored in memory of the wireless device. If the wireless device determines that the received file portion or received combination of file portions is already stored, then operation proceeds from step 208 to step 210. In step 210, the wireless device controls the monitoring rate of step 204 as a function of the amount of received file portions or received combinations of file portions which are already stored. For example, when a file portion already stored in memory is being received repeatedly by the wireless device and no new information is being recovered, the wireless device decreases the monitoring rate of step 204, since new information is not being recovered and energy is being used by the wireless device to monitor for, receive, and process received packets which are not communicating new information from the perspective of the wireless device.

If in step 208, the wireless device determines that the received file portion or received combination of file portions is not already stored in memory of the wireless device, then operation proceeds from step 208 to step 212. In step 212, the wireless device stores the received file portion or received combination of file portions. Operation proceeds from step 212 to step 214. In step 214, the wireless device determines whether or not the wireless device has stored information available to generate at least one new combination of file portions. If the wireless device determines that it does not have stored information available to generate at least one new combination of file portions, then operation proceeds from step 214 to step 215, where the wireless device is controlled to stop operation at the current time with regard to further processing of the received file portion or received combination of file portions from step 206.

However, if the wireless device determines that new information has been received and stored that may be combined with previously stored information, then operation proceeds from step 214 to step 218 via connecting node A 216.

In step 218, the wireless device generates at least one combination of file portions. Step 218 includes one or more or all of steps 220, 228, 230, 232, 234 and 236. In some embodiments, during different iterations of step 218, a different one of steps 220, 228, 230, 232, 234 and 236 are performed. In some embodiments, one or more of steps 220, 228, 230, 232, 234 and 236 may be performed in combination.

In step 220, the wireless device generates at least one combination of file portions from multiple received file portions. In some embodiments, step 220 includes step 222 in which the wireless device linearly combines multiple received file portions. In some embodiments, the linearly combining is an XORing of input values or a function based on adding and multiplying in a predictable manner. In various embodiments, step 222 includes step 224 or step 226. In step 224, the wireless device uses a predetermined function known to a plurality of devices in a system in which said wireless device operates, as part of performing the linear combining. In step 226, the wireless device uses a random linear function to combine received file portions as part of performing the linear combining.

In step 228, the wireless device generates at least one combination of file portions from received combinations of file portions. In step 230, the wireless device generates at least one combination of file portions from received combinations of file portions and received file portions. In step 232, the wireless device generates at least one linear combination of file portions from different file portions which were included in different received packets. In step 234, the wireless device generates at least one linear combination of file portions from a file portion included in a first received packet and a file portion which is a linear combination included in a second received packet. In step 236, the wireless device generates at least one combination of file portions from a file portion included in a second received packet and a file portion included in a third received packet.

Operation proceeds from step 218 to step 237. In step 237, the wireless device stores the generated at least one combination of file portions obtained from step 218. As, should be appreciated, a stored generated combination of file portions may be, and sometimes is, subsequently transmitted to other devices, used as input to generate other, e.g., new, combinations of file portions, e.g., in the future when additional information is received by the wireless device, used to solve for a file portion, and/or processed as part of reconstructing a file being communicated.

Returning to step 240, in step 240 the wireless device determines if the wireless device is to operate in a first mode of communications operation in which received portions of said file are transmitted or a second mode of communications operation in which combinations of portions of said file are transmitted, wherein at least one of said combinations of file portions includes fewer bits than a number of input bits used to generate said at least one combination of file portions.

Thus, at least some combinations which are transmitted in various embodiments when the device is not operating as a simple relay by simply retransmitting the received input, generating a combination involves one or more operations which result in fewer output bits than input bits. Consider for example if two equal size file portions are logically combined by ORing the bits of each file together as done in some embodiments. The combination of the two input portions will result in the same number of bits as an individual one of the two input portions. Such an output is half the number of input bits used to generate the output combination. In the case where a combination includes fewer bits than the number of input bits used to generate the combination, it should be appreciated that the combination is not a simple concatenation of the input bits which may be used in the case where simple retransmission is to be employed. Where individual file portions are concatenated, e.g., for retransmission, the size in bits of the output combination to be transmitted will be the same as the total number of input bits used to generate the combination. This is because the number of bits in the combination resulting from a concatenation operation will be equal to the sum of the number of bits in each input to the combination.

While simple ORing is a simple example of a combining operation that may be used to generate combinations of file portions, other operations may be used to combine portions of files to generate new combinations of file portions.

In some embodiments, the first mode is a relay mode and the second mode is a combination mode, in which received file information is combined and transmitted. In some embodiments, prior to performing step 240 the wireless device determines or identifies the method to be used for determining if the wireless communications device is to operate in the first mode of device operation or the second mode of device operation, e.g., from a plurality of alternative methods supported by the wireless device.

In various embodiments, step 240 includes one or more or all of steps 242, 244, and 246. In step 242, the wireless device determines the mode of operation based on at least one of motion of the wireless device or a geographic region in which the wireless device is located. In step 244, the wireless device selects the first mode of operation, e.g., relay mode, as the mode of operation, when said wireless device is stationary or at a geographic location wherein distribution of transmitted packets between nodes occurs in accordance with a known distribution pattern. The known distribution pattern may be a pattern that is known to be used in a geographic area or which devices in the area signal is in use. The distribution pattern indicates how content will be distributed between nodes resulting in a predictable distribution pattern, e.g., allowing, in the absence of a transmission error, the distribution process to avoid sending the same content to a node multiple times. The known distribution pattern may include routing information or simply information indicating that the content is distributed in a manner that ensures that particular file portions or packets will not be repeated multiple times to a node in the particular geographic area in which the pattern is used in the absence of a communication error. In step 246, the wireless device selects the second mode of operation, e.g., combination mode, as the mode of operation, when the wireless device is moving and said wireless device is not at a geographic location wherein distribution of transmitted packets between nodes occurs in accordance with a known distribution pattern. Step 240 is repeated on an ongoing basis. In some embodiments, step 240 is repeated periodically.

Operation proceeds from step 240 to step 248 in which the wireless device sets the wireless device to operate in the determined mode of communications operation. Operation proceeds from step 248 to step 250. In step 250, the wireless device determines if the wireless device is currently in the first mode of communications operation or in the second mode of communications operations. If the wireless device is in the first mode of communications operation, then operation proceeds from step 250 to step 252. In step 252, the wireless device transmits packets communicating received file portions if it is determined that wireless device is to operate in said first mode of operation. If the wireless device is in the second mode of communications operation, then operation proceeds from step 250 to step 254. In step 254, the wireless device transmits packets communicating combinations of file portions if it is determined that the wireless device is to operate in the second mode of operation. In some embodiments, step 254 includes step 256, in which the wireless device transmits, e.g., sequentially, packets communicating different combinations of file portions. In some embodiments, at least one of the transmitted packets of step 256 has been previously generated by the wireless device, e.g., in an iteration of step 232, 234 or step 236. In various embodiments, step 254 further includes step 257, in which the wireless device transmits combining information along with a combination of file portions in a transmitted packet.

Returning to step 258, in step 258, which is performed on an ongoing basis, the wireless device processes information to reconstruct the file being communicated. Inputs to step 258 include, e.g., stored received file portions or received combinations of file portions from multiple iterations of step 212 and stored generated combinations of file portions from multiple iterations of step 237. In some embodiments, step 258 includes step 260, which is performed during at least one iteration of step 258. In step 260, the wireless device processes combinations included in received packets to generate a complete set of content included in said file. In various embodiments, step 260 includes step 262 in which the wireless device uses a file portion communicated in a received packet in combination with combinations included in other received packets to generate said complete set of content. In some embodiments, the content is one of audio content, video content, or a combination of audio and video content.

In some embodiments, the wireless device, e.g., a mobile device, is preconfigured or signaled with the combination method to be used so that different wireless devices, e.g., different mobiles, use the same combining technique. In some other embodiments, combination information is signaled along with a combination of file portions. For example, in some embodiments, a header is included indicating the equation used to combine packet contents. In some such embodiments, the header includes information indicating the combined file portions and the method of combining, e.g., function used to combine the file portions.

Figure 3:
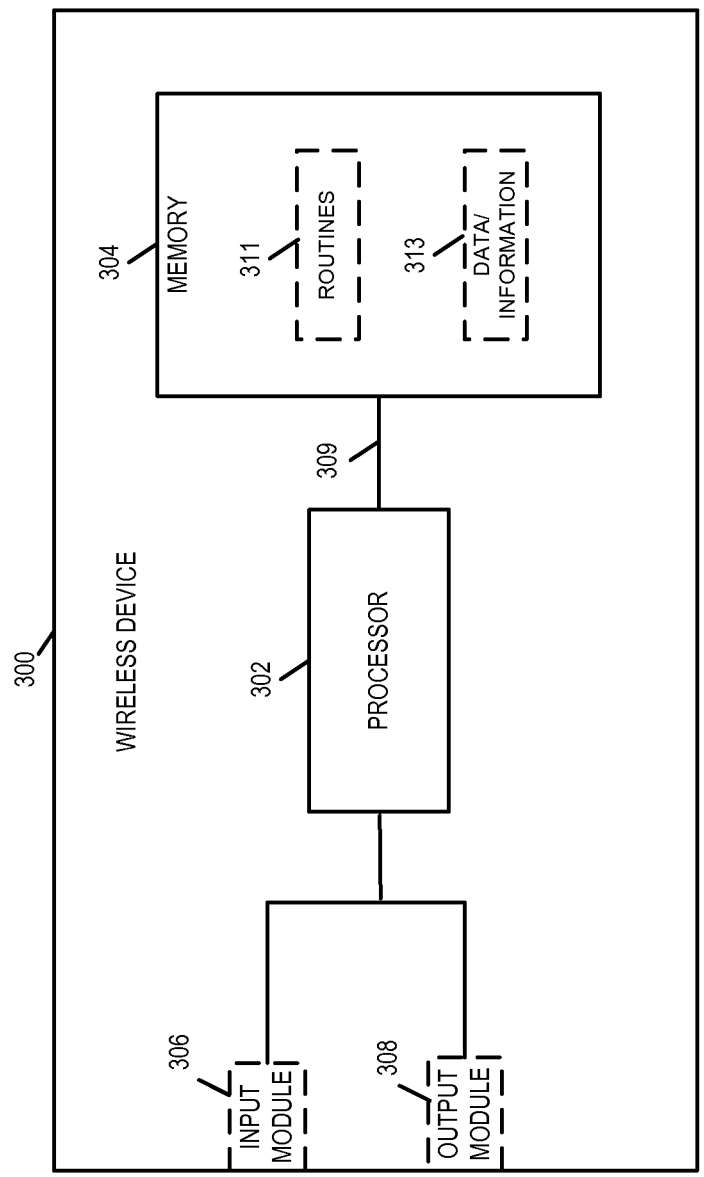
FIG. 3 is a drawing of an exemplary wireless device in accordance with an exemplary embodiment.

FIG. 3 is a drawing of an exemplary wireless device 300 in accordance with an exemplary embodiment. Exemplary wireless device 300 is, e.g., one of the wireless devices of system 100 of FIG. 1. Exemplary wireless device 300 may, and sometimes does, implement a method in accordance with flowchart 200 of FIG. 2.

Wireless device 300 includes a processor 302 and memory 304 coupled together via a bus 309 over which the various elements (302, 304) may interchange data and information. Wireless device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. In some embodiments, input module 306 includes a GPS receiver for determining the location of the wireless communications device 300. Output module 308 may include, and in some embodiments does include, a wireless transmitter and/or a wired or optical output interface for transmitting output. In some embodiments, memory 304 includes routines 311 and data/information 313. In various embodiments data/information 313 includes one or more or all of: pre-configured stored file portion combining information, wirelessly received file portion combining information, geographic region information, e.g., stored maps identifying different sets of non-overlapping geographic regions used in determining a mode of operation, a determined wireless communications device location, determined wireless communications device motion information, e.g., stationary/in-motion status and/or a determined wireless communications device speed, mode switching threshold value or values, e.g., speed thresholds use in determining a mode of operation, one or more received file portions, one or more recovered file portions, one or more received combinations of file portions, one or more generated combinations of file portions, a determined mode of operation, a received packet including a file portion, a received packet including a combination of file portions, a recovered file, a generated packet to be transmitted including a file portion, a generated packet including a combination of file portions, recurring timing/frequency structure information, information identifying alternative options for mode determination, information identifying the current in-use method for mode determination, information identifying alternative approaches for communicating combining information, information identifying the current in-use approach for communicating combining information, and communications protocol information.

In some embodiments, processor 302 is configured to: determine if the wireless device is to operate in a first mode, e.g., a relay mode, of communication operation in which received portions of a file are transmitted or a second mode, e.g. a combination mode, of communication operation in which combinations of portions of said file are transmitted, at least one of said combinations of file portions including fewer bits than a number of input bits used to generate said at least one combination of file portions; and transmit packets communicating received file portions if it is determined that the wireless device is to operate in said first mode of operation; and transmit packets communicating combinations of file portions if it is determined that the wireless device is to operate in said second mode of operation. In some embodiments, processor 302 is configured to combine received file information in the second mode of operation to generate a combination of file portions. In some embodiments, processor 302 is configured to determine whether or not the wireless device including processor 302 is stationary or moving. In some such embodiments, processor 302 is configured to determine the velocity of the wireless device. In some embodiments, processor 302 is configured to determine the geographic location of the wireless device.

In various embodiments, processor 302 is configured to generate said at least one combination of file portions from multiple received file portions. In some embodiments, processor 302 is configured to generate said at least one combination of file portions from received combinations of file portions and/or received file portions.

In various embodiments, processor 302 is configured to linearly combine said multiple received file portions, as part of being configured to generate said at least one combination of received file portions. In some such embodiments, processor 302 is configured to use a predetermined function known to a plurality of devices in a system in which said wireless device operates, as part of being configured to linearly combine. The predetermined function is, e.g., a function including XORing input values or a function based on adding and multiplying in a predictable manner. In some embodiments, processor 302 is configured to combine received file portions using a random linear function, as part of being configured to linearly combine.

Processor 302, in some embodiments, is configured to determine the mode of operation based on at least one of motion of said wireless device or a geographic region in which said wireless device is located, as part of being configured to determine if the wireless device is to operate in the first mode of communication operation or the second mode of communication operation. In some such embodiments, processor 302 is configured to select said first mode, e.g., relay mode, of operation when said wireless device is stationary or at a geographic location wherein distribution of transmitted packets between nodes occurs in accordance with a known distribution pattern; and select said second mode, e.g., combination mode, of operation when said wireless device is moving and said wireless device is not at a geographic location wherein distribution of transmitted packets between nodes occurs in accordance with a known distribution pattern, as part of being configured to determine if the wireless device is to operate in the first mode of communication operation or the second mode of communication operation.

In various embodiments, processor 302 is configured to transmit, e.g., sequentially transmit, packets communicating different combinations of file portions, as part of being configured to transmit packets communicating combinations of file portions when it is determined that the wireless device is to operate in said second mode of operation.

In some embodiments, processor 302 is configured to generate at least one linear combination of file portions from different file portions which were included in different received packets, prior to transmitting said packets communicating different combinations of file portions. In various embodiments, processor 302 is configured to generate at least one linear combination of file portions from a file portion included in a first received packet and a file portion which is a linear combination included in a second received packet, prior to transmitting said packets communicating different combinations of file portions. In some embodiments, processor 302 is configured to generate at least one combination of file portions from a file portion included a second received packet and a file portion included in a third received packet prior to transmitting said packets communicating different combinations of file portions.

In some embodiments, processor 302 is configured to process combinations included in received packets to generate a complete set of content included in said file.

In some such embodiments, processor 302 is further configured to use a file portion communicated in a received packet in combination with combinations included in other received packets to generate said complete set of content, as part of being configured to process combinations included in received packets to generate a complete set of content included in said file. In various embodiments, said content is one of audio content, video content, or a combination of audio and video content.

In various embodiments, processor 302 is configured to periodically repeat said step of determining if the wireless device is to operate in a first mode of communication operation in which portions of said file are transmitted or a second mode of communication operation in which combinations of portions of said file are transmitted, e.g., in accordance with a predetermined schedule.

In some embodiments, processor 302 is configured with the combination method to be used for combining file portions. In various embodiments, processor 302 is configured to retrieve and use stored information from memory 304 identifying and/or communicating the combination method to be used for combining file portions. In some embodiments, processor 302 is configured to receive information, e.g., via a received wireless signal, indicating a combination method to be used, e.g., with regard to file portions for a file or for a set of files. In some embodiments, different combining methods are used for different files. In some embodiments, processor 302 is configured to receive combining information along with a combination of file portions in a received packet. In some embodiments, processor 302 is configured to transmit combining information along with a combination of file portions in a transmitted packet.

Figures 4, 4A:
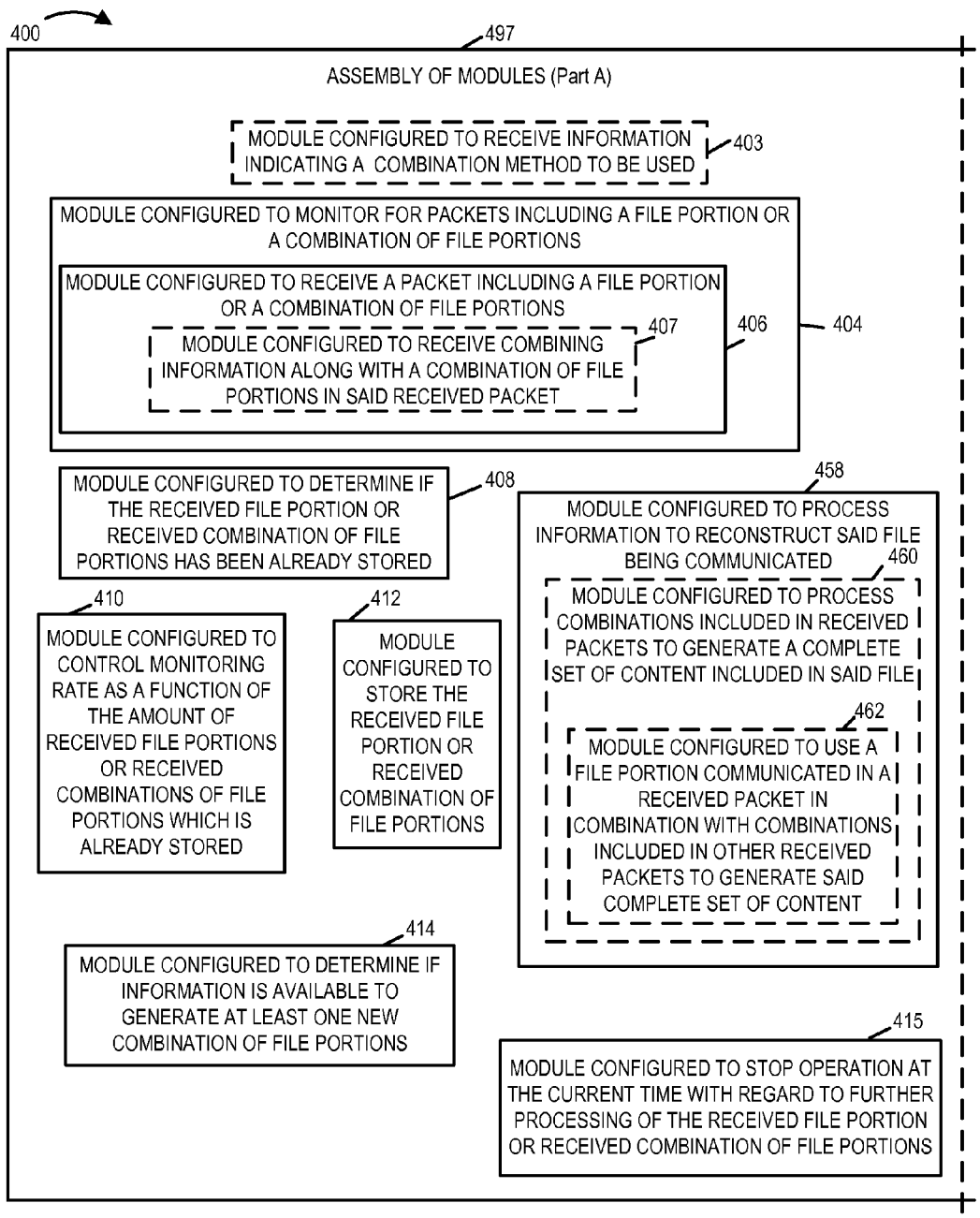
FIG. 4A is a first portion of an assembly of modules which may be included in the wireless device of FIG. 3 in accordance with an exemplary embodiment.
Figure 4B:
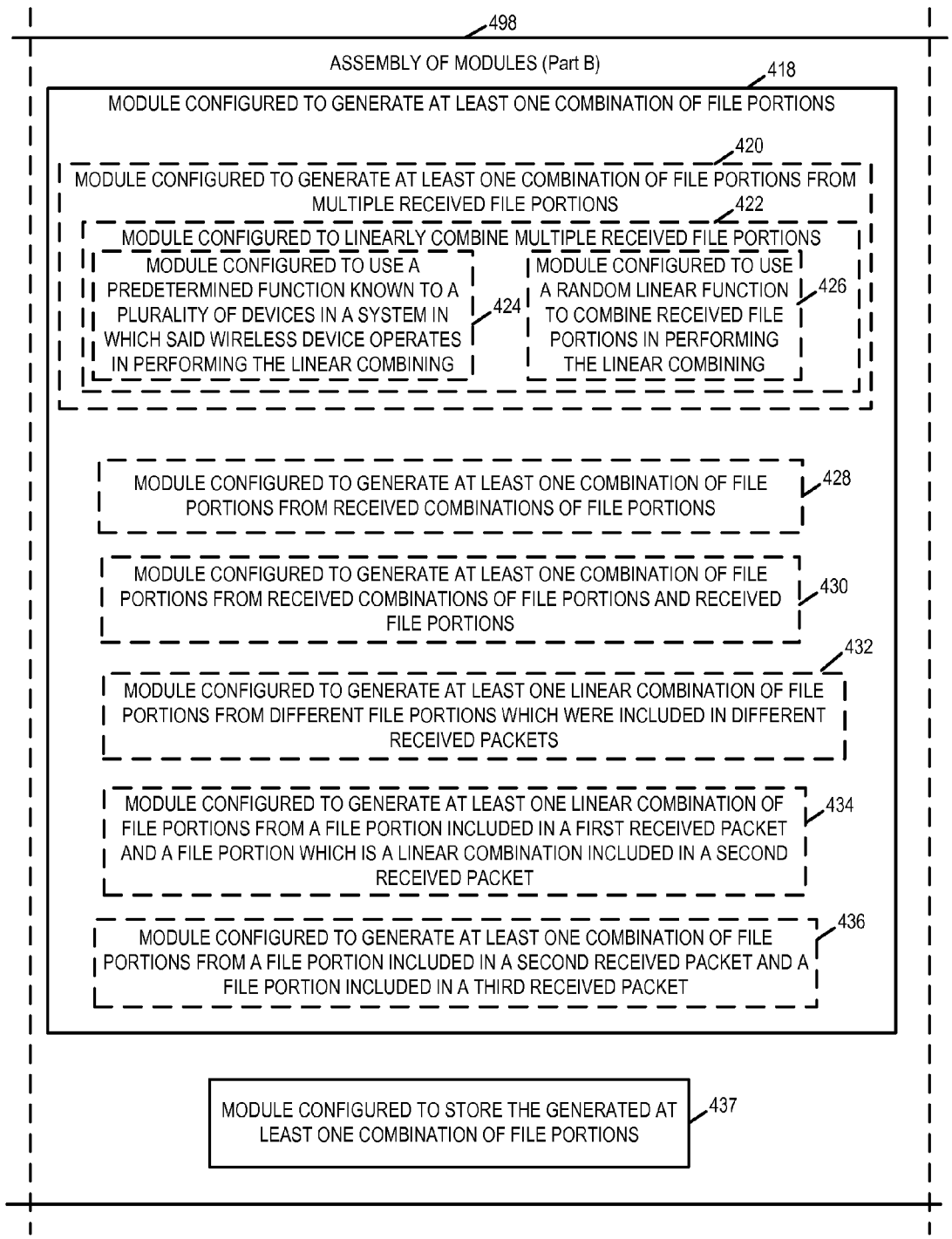
FIG. 4B is a second portion of an assembly of modules which may be included in the wireless device of FIG. 3 in accordance with an exemplary embodiment.
Figure 4C:
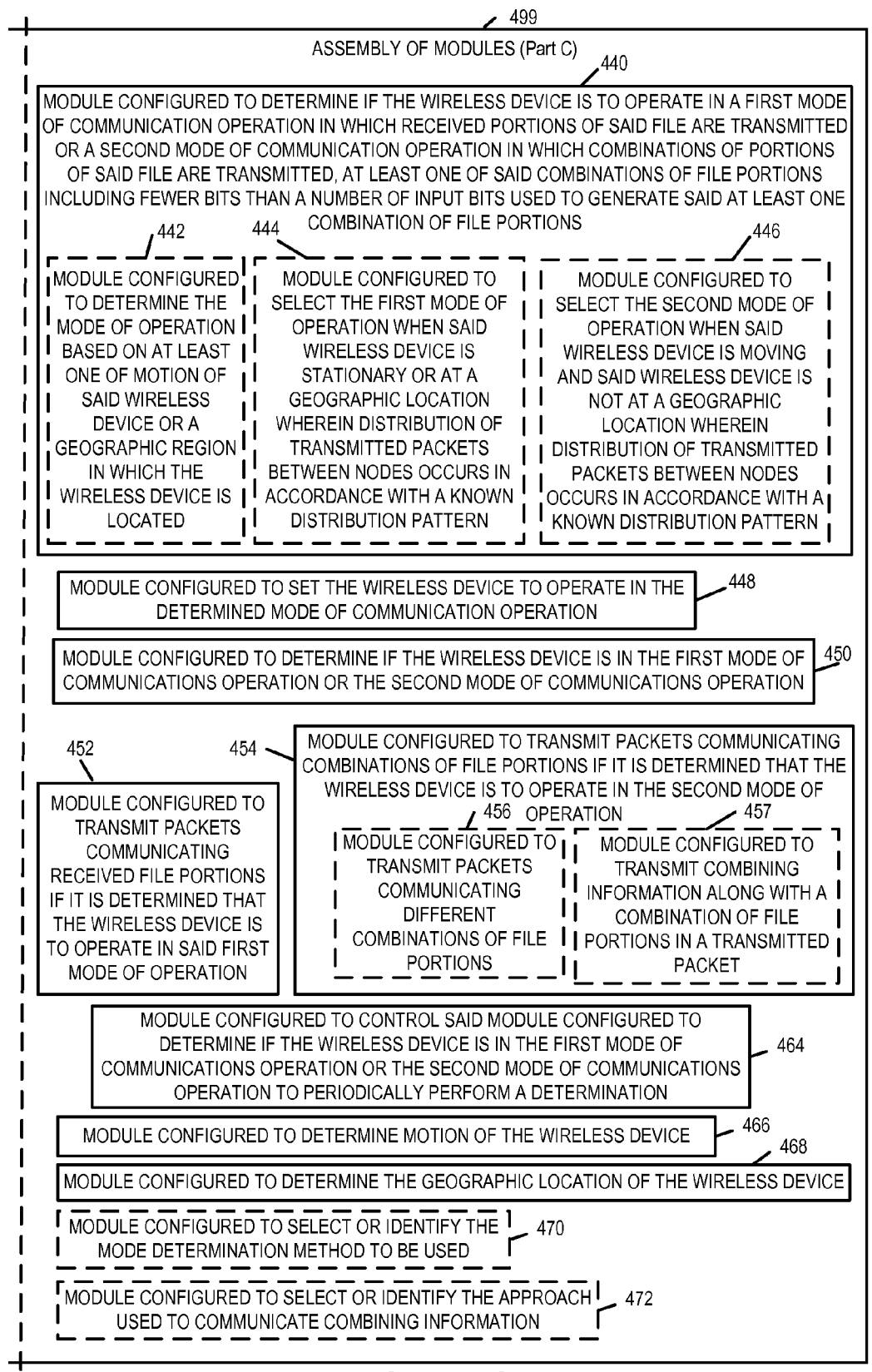
FIG. 4C is a third portion of an assembly of modules which may be included in the wireless device of FIG. 3 in accordance with an exemplary embodiment.

FIG. 4, comprising the combination of FIG. 4A, FIG. 4B and FIG. 4C, is a drawing of assembly of modules 400, including part A 497, part B 498 and part C 499, which can, and in some embodiments is, used in the exemplary wireless device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless device 300 shown in FIG. 3. In some such embodiments, the assembly of modules 400 is included in routines 311 of memory 304 of wireless device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless device 300 or elements therein such as the processor 302, to perform the functions of the corresponding steps illustrated and/or described in the method of flowchart 200 of FIG. 2.

Assembly of modules 400 includes a module 404 configured to monitor for packets including a file portion or a combination of file portions, a module 408 configured to determine if the received file portion or received combination of file portions has been already stored, a module 410 configured to control the monitoring rate as a function of the amount of received file portions or received combinations of file portions which have been already stored, a module 412 configured to store the received file portion or received combination of file portions, a module 414 configured to determine if information is available to generate at least one new combination of file portions, and a module 415 configured to stop operation at the current time with regard to further processing of the received file portion or received combination of file portions. Module 404 includes a module 406 configured to receive a packet including a file portion or a combination of file portions. In some such embodiments, module 406 includes a module 407 configured to receive combining information along with a combination of file portions in said received packet.

Assembly of modules 400 further includes a module 418 configured to generate at least one combination of file portions, and a module 437 configured to store the generated at least one combination of file portions. In various embodiments, module 418 includes one or more or all of a module 420 configured to generate at least one combination of file portions from multiple received file portions, a module 428 configured to generate at least one combination of file portions from received combinations of file portions 428, a module 430 configured to generate at least one combination of file portions from received combinations of file portions and received file portions, a module 432 configured to generate at least one linear combination of file portions from different file portions which were included in different received packets, a module 434 configured to generate at least one linear combination of file portions from a file portion included in a first received packet and a file portion which is linear combination included in a second received packet, and a module 436 configured to generate at least one combination of file portions from a file portion included in a second received packet and a file portion included in a third received packet.

In some embodiments, module 420 includes a module 422 configured to linearly combine multiple received file portions. In some such embodiments, module 422 includes one or both of a module 424 configured to use a predetermined function known to a plurality of device in a system in which the wireless device operates in performing linearly combining, and a module 426 configured to use a random linear function to combine received file portions in performing the linear combining.

Assembly of modules 400 further includes a module 440 configured to determine if the wireless device is to operate in a first mode of communications operation in which received portions of said file are transmitted or a second mode of communication operation in which combinations of portions of said file are transmitted, at least one of said combinations of file portions including fewer bits than a number of input bits used to generate said at least one combination of file portion, a module 448 configured to set the wireless device to operate in the determined mode of communication operation, and a module 450 configured to determine if the wireless device is in the first mode of communications operation or the second mode of communications operation. In some embodiments, module 440 includes one or more or all of a module 442 configured to determine the mode of operation based on at least one of motion of said wireless device or a geographic region in which the wireless device is located, a module 444 configured to select the first mode of device operation when said first wireless device is stationary or at a geographic location wherein distribution of transmitted packets between nodes occurs in accordance with a known distribution pattern, and a module 446 configured to select the second mode of operation when said wireless device is moving and said wireless device is not at a geographic location wherein distribution of transmitted packets between nodes occurs in accordance with a known distribution pattern.

Assembly of modules 400 further includes a module 452 configured to transmit packets communicating received file portions if it is determined that wireless device is to operate in said first mode of device operation, and a module 454 configured to transmit packets communicating combinations of file portions if it is determined that the wireless device is to operate in the second mode of operation. In various embodiments, module 454 includes one or both of a module 456 configured to transmit, e.g., sequentially, packets communicating different combination of file portions and a module 457 configured to transmit combining information along with a combination of file portions in a transmitted packet. Assembly of modules 400 further includes a module 464 configured to control said module 440 configured to determine if the wireless device is to operate in the first mode of operation or the second mode of operation to periodically perform a determination operation.

Assembly of modules 400 further includes a module 458 configured to process information to reconstruct said file that is being communicated to the wireless device. In some embodiments, module 458 includes a module 460 configured to process combinations included in received packets to generate a complete set of content included in said file. In some such embodiments, module 460 includes a module 462 configured to use a file portion communicated in a received packet in combination with a combinations included in other received packets to generate said complete set of content.

In some embodiments, assembly of modules 400 includes a module 403 configured to receive information indicating a combination method to be used by the wireless device. Assembly of modules 400 further includes a module 466 configured to determine motion of the wireless device, e.g., determine whether the wireless device is stationary or moving, and determine the velocity of wireless device when it is moving. Assembly of modules 400 also includes a module 468 configured to determine a geographic location of the wireless device, e.g., based on received GPS signals, based on received radio signals, based on a self-determined position fix, based on a position fix of the wireless device from another device, or based on a position fix of another device in close proximity to the wireless device.

In some embodiments, assembly of modules 400 includes a module 470 configured to select or identify the mode determination method to be used, e.g., from a plurality of alternative mode determination methods supported by the wireless communications device. For example, in different network, in different system, in different areas and/or or at different times different approaches for determining whether to operate in the first or second mode as used. Exemplary table 600, which may be included in memory 304 illustrates four exemplary methods with different criteria for mode determination. In some embodiments, module 470 makes its selection based on stored pre-configured information or based on a received signal, e.g., from a base station. In some embodiments, module 470 makes its identification based on analyzing received packets being transmitted by other mobile wireless devices. In some such embodiments, module 470 makes its identification based on estimated speed of other mobile devices transmitting signals.

In some embodiments, assembly of modules 400 includes a module 472 configured to select or identify the approach to be used to communicate combining information, e.g., from a plurality of alternative approaches supported by the wireless communications device. For example, in different network, in different system, in different areas and/or or at different times different approaches for communicating combining information as used. Drawing 700 illustrates three exemplary approaches for communicating combining information. In some embodiments, module 472 makes its selection based on stored pre-configured information or based on a received signal, e.g., from a base station. In some embodiments, module 472 makes its identification based on analyzing received packets being transmitted by other mobile wireless devices.

In some embodiments, the first mode of device operation is a relay mode of operation in which received file portions are retransmitted, and the second mode of device operation is a combination mode in which received file information is combined, e.g., linearly combined, and transmitted. In some embodiments, the combining is linearly combining. In some such embodiments, the linearly combining includes XORing input values. In various embodiments, the combining includes using a function based on adding and multiplying in a predictable manner. In some embodiments, the content included in a file is one of audio content, video content or a combination or audio and video content.

Various aspects and/or features of some, but not necessarily all, embodiments are further discussed below. Various embodiments are directed to a method of delivering the content of a file, e.g., a large file which may be divided into a plurality of distinct portions. The file content is delivered using packets which include information coded according to a method that is suited for the mobility state and/or geographic location of the device receiving and/or transmitting the packets communicating information corresponding to the file. The file packets may be coded as individual distinct portions of the file or as a linear combination of file portions. The packets communicating linear combinations of distinct file portions are particularly well suited for mobile applications with each packet being likely to communicate some distinct information, while the communication of packets which communicate individual distinct portions is particularly well suited for static (e.g., non-mobile) applications or where the distribution of packets is well known in a geographic location decreasing the chance that the same file portion will be transmitted repeatedly by multiple devices in an area decreasing the chance that reception of a packet will provide some new information that may be used to complete the collection of the content of the file.

A vehicular network may have highly varying topologies—in parking lots, the neighborhood may be static for extended periods of time whereas in mobile situations, the vehicles in one's neighborhood may change over a period of seconds. When a vehicle is in a mobile state, the number of vehicles it may observe can be quite large, and the vehicles may come from very different geographic locations with 'innovative' data—(data that is not common to what a device may already contain). However the contact time with the vehicles may not be long. In such scenarios it may be important to take advantage of the available innovative data and obtain useful pieces of the file in every transmission. Since the topology is changing very quickly, it may not be possible to schedule efficient broadcast trees etc.

In a more static scenario such as a parking lot, it may be possible to construct a static broadcast tree for relaying the portions from one vehicle to each of the other vehicles. That is, the static nature of the network may allow simpler methods for efficient broadcasting. Thus, there is a need in the state of the art for coding schemes that are appropriate at different mobility levels.

Various embodiments, describe a method to switch the coding scheme based on the mobility of a given vehicle. A wireless device in a vehicle, in some embodiments, ascertains whether it is in a highly mobile environment or a static environment. The determination of the environment, in some embodiments, is be based on GPS measurements indicating vehicle velocity or based on the change in the neighboring devices. If a vehicle's wireless device estimates that it is in a highly mobile environment, the wireless device, e.g., mobile, changes the way the portions of a content file are coded. For example, in a static network, the vehicle's wireless device rebroadcasts portions that are received earlier, but in a highly mobile scenario, the vehicle's wireless device sends out packets that are linear combinations of received portions so that even if a vehicle's wireless device has observed some innovative packets, the linear combinations would also be innovative.

A device receiving a packet communicating a linear combination of file portions may generate a new linear combination from a received packet and previously received packets since the linear combination of two linear combinations is also a linear combination. In some embodiments, information about how the transmitted linear combination of file portions included in a packet was generated is included in the transmitted packet. Since mobile devices will tend to transmit different linear combinations, a receiving device is likely to obtain at least some new information from a packet as opposed to the case where a receiving device simply receives a copy of a packet which it previously received which provides no new information for completing collection of the contents of the file.

In accordance with an aspect of some embodiments, the contents of a file may be, and sometimes are, obtained from some packets which communicate distinct portions of a file and other packets which communicate linear combinations of distinct portions of a file. The device transmits packets communicating linear combinations of distinct file portions when operating in a mobile state of operation and packets communicating distinct file portions when operating in a static mode of operation or when in a geographic region where a predetermined packet distribution structure between nodes in the geographic area is known thereby reducing the risk of multiple transmissions of the same packet portions to the same nodes.

The methods and apparatus of various embodiments are particularly well suited for use by mobile devices which may receive a portion of a file while in a static state, e.g., at a rest area, service area, etc. and which may receive the remainder of the file contents via communications with other devices during a mobile state of operation, e.g., while driving on the highway, as the mobile devices transmit different linear combinations of the file portions that they received and recover missing file portions for the received signals.

Since the use of linear combinations requires more processing power to recover the file portions from the received linear combinations, e.g., by solving equations based on the linear combinations and/or known packet portions and some linear combinations, the use of linear combinations in the mobile state reduces the risk that an individual received packet will not communicate any new useful information, i.e., will be redundant, to file content information which was previously received. Thus, in the above described manner, mobile devices can exchange information corresponding to the different file portions for which they have information and recover from the received information the content of the file.

Consider that a large file F1 may be divided into a plurality of portions P1 through PN:

F1=P1 . . . PN

The individual portions P1 through PN can be communicated in separate packets, e.g., Packets PK1 to PKN. This approach is used when operating in a first mode of operation, e.g., a static mode of operation.

At the time a wireless device, e.g., wireless terminal in a car, starts transmitting the file portions to other wireless devices it may not have all of the portions P1 to PN.

During a second mode of operation, e.g., a mobile mode of operation, the wireless device transmits linear combinations of distinct portions of the file F1. A linear combination (LC) which is transmitted may be expressed as follows: LC=A1P1 +A2P2+ . . . ANPN where A1 through AN are multiplier coefficients applied to the contents of the corresponding file portions and where + is a linear operator, e.g., addition or another linear operator.

In some embodiments, information about the coefficients A1 . . . AN is included in the transmitted packet with the linear combination LC. While this information may be viewed as overhead, it is relatively small compared to the number of bits in the transmitted linear combination LC.

If there are 100 distinct packet portions one can recover the entire file by receiving 100 different linear combinations allowing for solving for each of the variables representing distinct file portions, receiving 100 distinct file portions or by receiving a combination of distinct file portions and linear combinations and solving, using the received linear combinations, for the file portions which are not expressly communicated as distinct file portions.

A wireless device transmitting linear combinations of file portions can, and sometimes does, transmit different linear combinations over time thereby providing different information to the devices receiving the transmissions rather than the same information repeatedly.

In some embodiments, with regard to the first mode of operation, the number of file portions can be, and sometime is, different from the number of packets used to communicate the full set of file portions corresponding to the file, e.g., multiple file portions may be communicated in a packet or a single file portion may be communicated in multiple packets.

Figure 5:
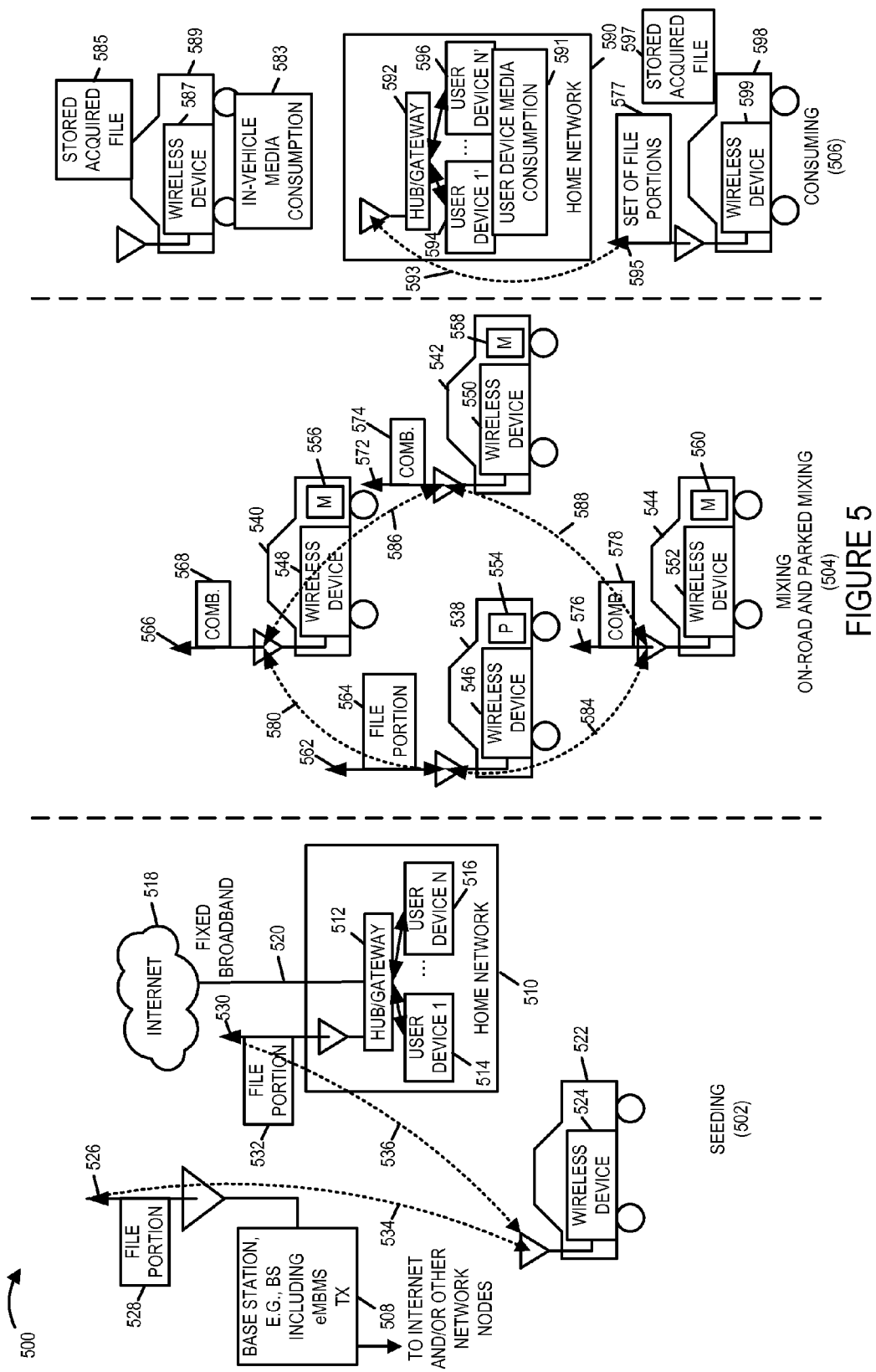
FIG. 5 illustrates exemplary operations and signaling in accordance with an exemplary embodiment.

FIG. 5 includes a drawing 500 illustrating exemplary operations and exemplary signaling in an exemplary communications system in accordance with an exemplary embodiment. Portion 502 of drawing 500 illustrates seeding in which wireless device 524 acquires some initial file portions corresponding to a file. Vehicle 522 including wireless device 524 is situated in the vicinity of base station 508 and home network 510. Base station 508, e.g., a base station including an Evolved Multicast Broadcast Multimedia Services (eMBMS) transmitter, transmits signal 526 including a packet which conveys file portion 528. Home network 510 includes a hub/gateway device 512. The hub gateway device 512 is coupled to the Internet 518 via a fixed broadband link 520. Hub gateway device 512 is also coupled to a plurality of user devices (user device 1 514, . . . , user device N 516). User devices (514, . . . , 516), are, e.g., computers, stationary communications devices, handheld communications devices, electronic pads, electronic tablets, televisions, displays, MP3 devices, MP4 devices, etc. Hub/gateway 512 transmits wireless signal 530 including a packet which conveys file portion 532. File portion 528 and file portion 532 may be, and sometimes are, different portions of the same file. Transmitted signals (526, 530) are received and recovered by wireless device 524 of vehicle 522, as indicated by arrows (534, 536). Wireless device 524 stores in its memory the recovered file portions (528, 532). In addition to storing file portions (528, 532), wireless device 524 generates a combination, e.g., a linear combination, based on the received file portions (528, 532). Although illustrated for a case where wireless device 524 receives two file portions, it may be appreciated that wireless device 524 may receive more file portions, e.g., depending upon how long the wireless device is situated at its location in the vicinity of base station 508 and/or home network 510, the rate of transmission of file portions, the amount of file portions being transmitted by base station 508 and/or home network 510, and/or the amount time of the wireless device 524 monitors for file portions.

Portion 504 of drawing 500 illustrates mixing in which exemplary wireless devices (546, 548, 550, 552) in exemplary vehicles (538, 540, 542, 544) perform on-road and parked mixing in accordance with an exemplary embodiment. In this exemplary embodiment, a wireless communications device determines a mode of operation as a function of whether or not it is stationary, e.g., parked, or moving. In this example, vehicle 538 including wireless device 546 is parked as indicated by box 554 with letter "P"; vehicle 540 including wireless device 548 is moving as indicated by box 556 with letter "M"; vehicle 542 including wireless device 550 is moving as indicated by box 558 with letter "M"; and vehicle 544 including wireless device 552 is moving as indicated by box 560 with letter "M". In this embodiment, if a wireless device is determined to be parked, the wireless device is controlled to be operated in a first mode, e.g., a relay mode of operation, while if the wireless device is determined to be moving, the wireless device is controlled to be operated in a second mode of operation, e.g., a combination mode of operation in which the wireless device transmits combinations, e.g., linear combinations of received file portions.

Wireless device 546 generates and transmits signal 562 communicating a packet including file portion 564. Wireless device 548 generates and transmits signal 566 communicating a packet including a combination 568 of file portions, e.g., a linear combination of file portions. Wireless device 550 generates and transmits signal 572 communicating a packet including a combination 574 of file portions, e.g., a linear combination of file portions. Wireless device 552 generates and transmits signal 576 communicating a packet including a combination 578 of file portions, e.g., a linear combination of file portions. Wireless device 546 and wireless device 548 are within communications range of one another, and each device receives the transmitted signal from the other device as indicated by bi-directional arrow 580. Wireless device 546 and wireless device 552 are within communications range of one another, and each device receives the transmitted signal from the other device as indicated by bi-directional arrow 584. Wireless device 548 and wireless device 550 are within communications range of one another, and each device receives the transmitted signal from the other device as indicated by bi-directional arrow 586. Wireless device 550 and wireless device 552 are within communications range of one another, and each device receives the transmitted signal from the other device as indicated by bi-directional arrow 588.

Wireless device 546 receives combination of file portions 568 and combination of file portions 578 and stores the received information. Wireless device 546 may, and sometimes does recover a file portion based on the recently received information and previously stored information. Wireless device 546 may, and sometimes does, generate a new combination, e.g., a new linear combination of file portions, based on the recently received information and/or based on stored information.

Wireless device 548 receives file portion 564 and combination of file portions 574 and stores the received information. Wireless device 548 may, and sometimes does, recover a file portion based on the recently received information and previously stored information. Wireless device 548 may, and sometimes does, generate a new combination, e.g., a new linear combination of file portions, based on the recently received information and/or based on stored information.

Wireless device 550 receives combination of file portions 568 and combination of file portions 578 and stores the received information. Wireless device 550 may, and sometimes does recover a file portion based on the recently received information and previously stored information. Wireless device 550 may, and sometimes does, generate a new combination, e.g., a new linear combination of file portions, based on the recently received information and/or based on stored information.

Wireless device 552 receives file portion 564 and combination of file portions 574 and stores the received information. Wireless device 552 may, and sometimes does, recover a file portion based on the recently received information and previously stored information. Wireless device 552 may, and sometimes does, generate a new combination, e.g., a new linear combination of file portions, based on the recently received information and/or based on stored information.

Portion 506 of drawing 500 illustrates consuming of content in accordance with an exemplary embodiment. Consider that wireless device 587 included in vehicle 589 has acquired a complete file, as indicated by stored acquired file block 585. The file was acquired by receiving file portions and receiving combinations of file portions, e.g., linear combinations of file portions, and solving for file portions which were not received directly. With regard to vehicle 589 and wireless device 587, in-vehicle media consumption is performed by the wireless device 583, as indicated by block 583. For example, wireless device plays back the stored acquired file to a user in vehicle 589 on a display and/or via a speaker.

Further, consider that wireless device 599 included in vehicle 598 has also acquired a complete file, as indicated by stored acquired file block 597. The file was acquired by receiving file portions and receiving combinations of file portions, e.g., linear combinations of file portions, and solving for file portions which were not received directly. Wireless device 599, is currently in the vicinity of home network 590. Wireless device 599 generates and transmits wireless signals 595 to hub/gateway 592 including a set of file portions 577 corresponding to stored acquired file 597. Hub/gateway 592 receives signals 595 and recovers the set of file portions 577, as indicated by arrow 593. Hub/gateway 592 distributes the recovered information, e.g., media content, to user devices (user device 1' 594, ..., user device N' 596). The user devices (594, 596) consume the media content, as indicated by block 591. For example, one or more of the user devices (594, ..., 596) playback the media obtained from the stored acquired file 597.

In various embodiments, a mobile wireless device generates new linear combinations from the data/packets it has acquired. In some embodiments, the mobile wireless device is located in a vehicle. In some such embodiments, the mobile wireless device is embedded within a vehicle. In various embodiments, a mobile wireless device switches between communicating combinations, e.g., linear combinations and regular packets, which are not linear combinations, based on vehicle motion or location.

It should be appreciated that an individual wireless device, e.g., wireless device 524 in vehicle 522, may perform each operation illustrated in drawing 500 of FIG. 5, with different operations being performed at different times depending upon the situation of the wireless device. For example, after vehicle 522 including wireless device 524 has acquired a few initial file portions from base station 508 and/or hub/gateway 512, the vehicle may drive off, e.g. out of range of base station 508 and home network 510. Subsequently, wireless device 524 is moving, determines that it is moving, and transmits combinations of file portions while it is moving. At another time, wireless device 524 is parked, determines that it is parked, and transmits file portions. The transmitted signals, e.g., communicating combinations of file portions or file portions, may be received by other wireless devices in its vicinity. In addition, wireless device 524 continues to receive file portions and combinations of file portions from other wireless devices. Wireless device 524 further solves for file portions using received information and stored information. Wireless device 524 further generates new combinations, e.g., new linear combinations of file portions using received information and/or stored information. At some point in time, wireless device 524 has recovered the full set of file portions corresponding to the file of interest. Wireless device 524 can, and sometimes does, present the acquired file to a user within vehicle 522. Wireless device 524 can, and sometimes does, transmit the acquired file, e.g., to a hub/gateway of a home network for presentation to a user at the home network site.

Figure 6:
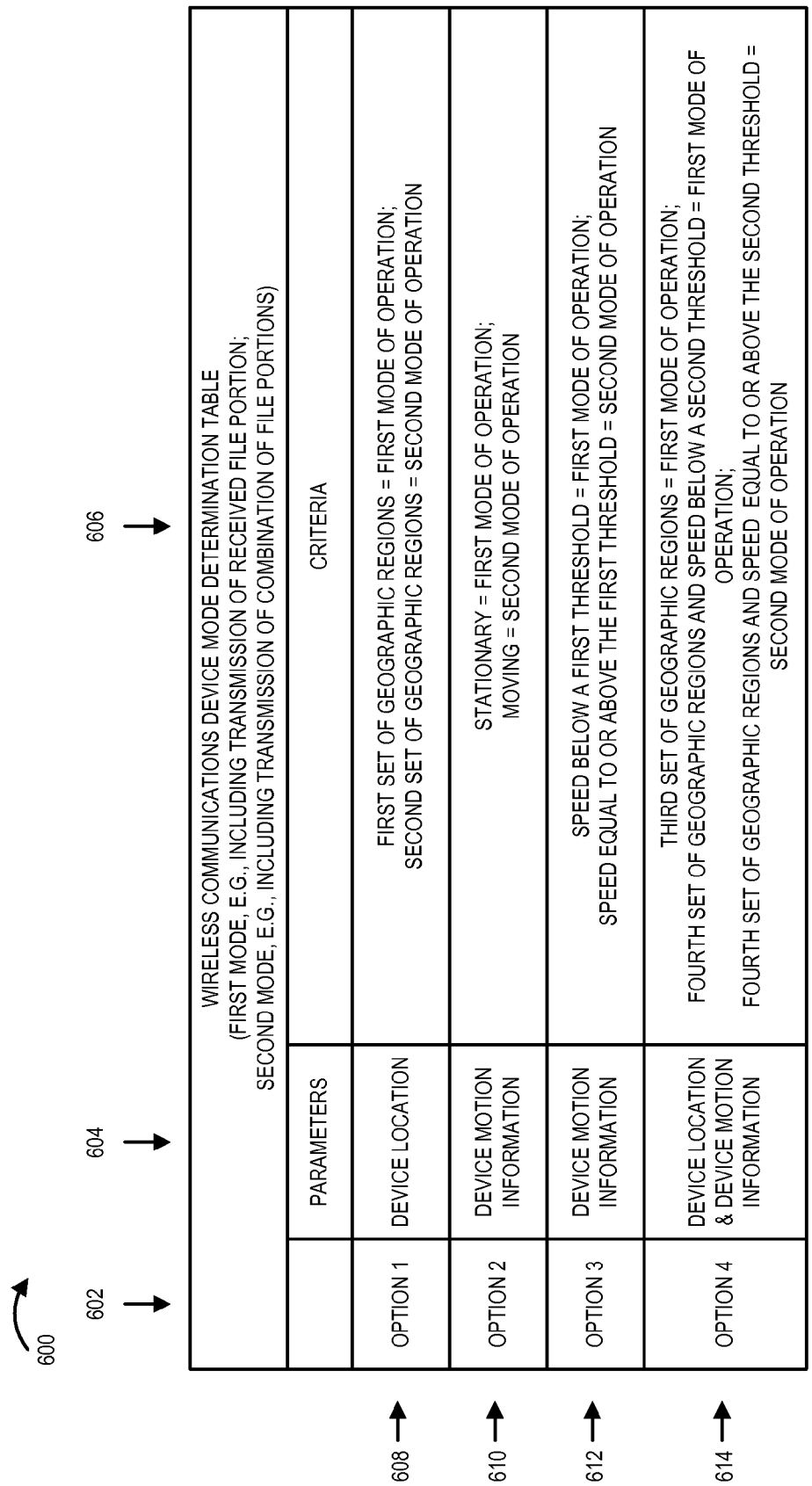
FIG. 6 is a drawing of an exemplary wireless communications device mode determination table in accordance with various exemplary embodiments.

FIG. 6 is a drawing of an exemplary wireless communications device mode determination table 600 in accordance with various exemplary embodiments. The first mode is, e.g., a mode of device operation which includes transmission of received file portions by the wireless communications device operating in the first mode, and the second mode is, e.g., a mode of device operation including transmission of a combination, e.g., a linear combination, of file portions by the wireless communications device operating in the second mode. In some embodiments, a wireless communications device, e.g., a wireless communications device implementing a method of flowchart 200 of FIG. 2 and/or wireless communications device 300 of FIG. 3, supports one or more or all of the various options illustrated in table 600. First column 602 lists options; second column 604 lists parameters used in the mode determination corresponding to each of the options; and third column 606 lists mode determination criteria corresponding to each of the options.

Row 608 lists option 1 in which a wireless communications device determines its mode of operation based on its location. If the wireless communications device is located in a first set of geographic regions, the wireless communications device determines its mode of operation to be the first mode of operation. If the wireless communications device is located in a second set of geographic regions, the wireless communications device determines its mode of operation to be the second mode of operation. The first set of geographic regions and the second set of geographic regions are non-overlapping.

Row 610 lists option 2 in which a wireless communications device determines its mode of operation based on its state of motion. If the wireless communications device is stationary, the wireless communications device determines its mode of operation to be the first mode of operation. If the wireless communications device is moving, the wireless communications device determines its mode of operation to be the second mode of operation.

Row 612 lists option 3 in which a wireless communications device determines its mode of operation based on its state of motion. If the wireless communications device is stationary or moving at a speed below a first threshold, the wireless communications device determines its mode of operation to be the first mode of operation. If the wireless communications device is moving at a speed equal to or greater than the first threshold, the wireless communications device determines its mode of operation to be the second mode of operation.

In some embodiments, slightly different speed thresholds, e.g., which vary by 10% or less, are used in place of a single first threshold for transitioning into the first mode of operation and transitioning into the second mode of operation, e.g., to provide hysteresis and prevent rapid toggling back and forth between the first and second modes. For example, $Threshold1_{Mode1to2}$ is used in determining whether or not to transition into the second mode of operation and $Threshold1_{Mode2to1}$ is used in determining whether or not to transition into the first mode of operation, where $Threshold1_{Mode2to1}$ is 5% smaller than $Threshold1_{Mode1to2}$. Consider that the wireless device is stationary and starts in the first mode of operation. When the wireless device's speed, e.g., average speed over a predetermined time interval, reaches or exceeds $Threshold1_{Mode1to2}$, the wireless device transitions from the first mode of operation to the second mode of operation. While in the second mode of operation, when the wireless device's speed, e.g., average speed over a predetermined time interval, falls below the $Threshold1_{Mode2to1}$, the wireless device transitions from the second mode of operation to the first mode of operation.

Row 614 lists option 4 in which a wireless communications device determines its mode of operation based on its location and its state of motion. If the wireless communications device is located within a third set of geographic regions, the wireless communications device determines its mode of operation to be the first mode of operation. If the wireless communications device is located within a fourth set of geographic regions and the speed of the wireless communications device is below a second threshold, the wireless communications device determines its mode of operation to be the first mode of operation. If the wireless communications device is located within the fourth set of geographic regions and the speed of the wireless communications device is greater than or equal to the second threshold, the wireless communications device determines its mode of operation to be the second mode of operation. The third and fourth sets of geographic regions are non-overlapping. In some embodiments, slightly different speed thresholds, e.g., which vary by 10% or less, are used in place of a single second threshold for transitioning into the first mode of operation and transitioning into the second mode of operation, e.g., to provide hysteresis and prevent rapid toggling back and forth between the first and second modes.

Figure 7:
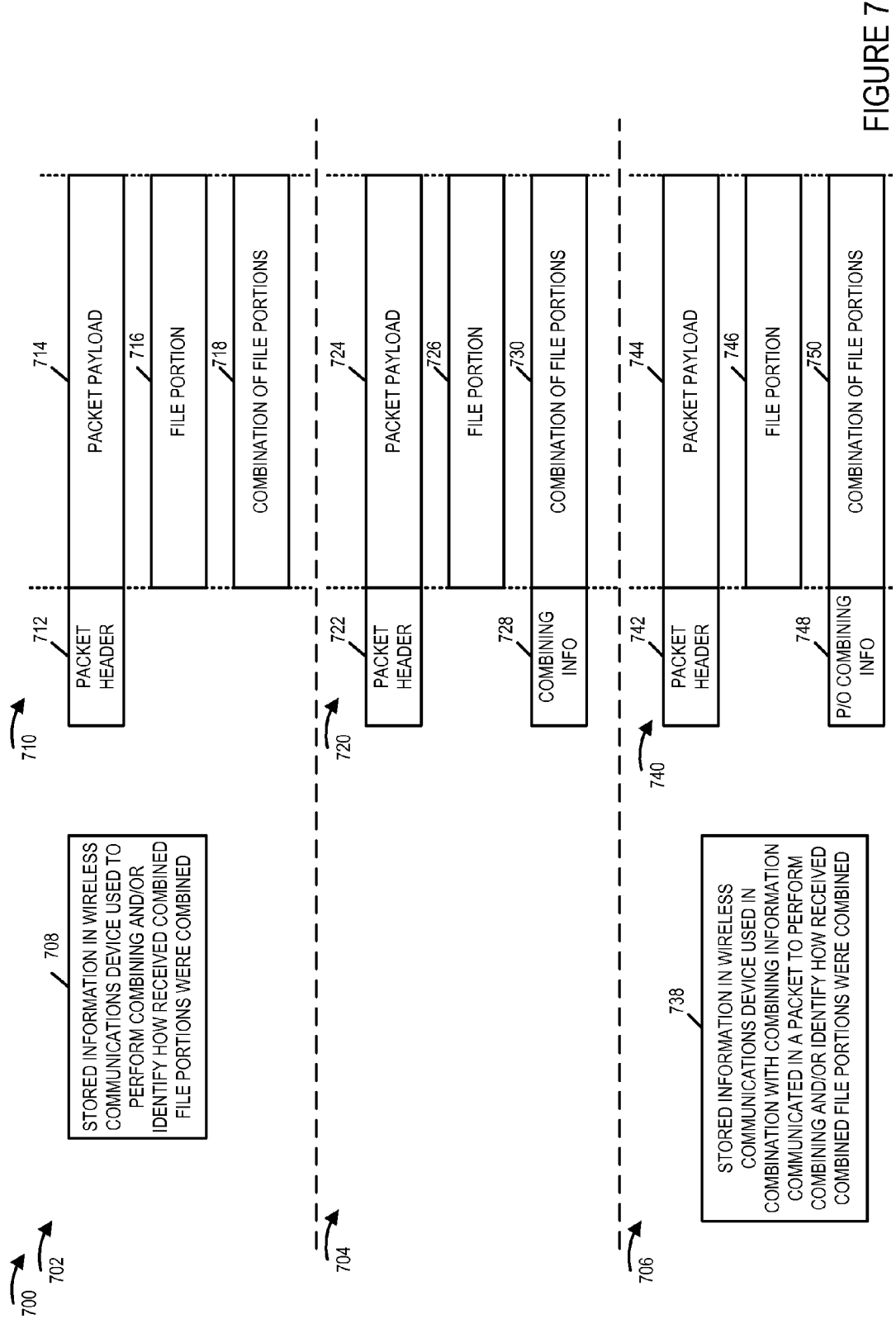
FIG. 7 is a drawing illustrating three exemplary approaches of communicating file portions and combinations of files portions in accordance with various embodiments.

FIG. 7 is a drawing 700 illustrating three exemplary approaches of communicating file portions and combinations of file portions in accordance with various embodiments. In some embodiments, a wireless communications device, e.g., a wireless communications device implementing a method of flowchart 200 of FIG. 2 and/or wireless communications device 300 of FIG. 3, supports one or more or all of the various approaches illustrated in drawing 700 of FIG. 7.

Drawing 702 illustrates a first approach in which stored information 708 in the wireless communications device is used to perform combining of file portions and/or identify how received file portions were combined. Stored combining information 708 may be obtained via pre-configuration or via wireless signaling. In some embodiments, the wireless communications device is pre-configured with the combination method to be used so that different wireless communications devices use the same combining technique. In other embodiments, the wireless communications devices in the system receive wireless signals, e.g., broadcast signals, communicating the combination method to be used so that different wireless communications devices use the same combining technique. Drawing 710 illustrates an exemplary packet corresponding to the first approach including a packet header portion 712 and a packet payload portion 714. The packet payload portion conveys either a file portion 716 or a combination of file portions 718, depending upon the mode of device operation.

Drawing 704 illustrates a second approach in which combining information is communicated in a packet along with the combined information. Drawing 720 illustrates an exemplary packet corresponding to the second approach including a packet header portion 722 and a packet payload portion 724. The packet payload portion 724 conveys either a file portion 726 or a combination of file portions 730, depending upon the mode of device operation. When the packet payload portion 724 conveys a combination of file portions, the packet header portion 722 conveys combining information 728. The combining information 728 is, e.g., information indicating which file portions are being combined and the method, e.g., function, used to combine the indicated file portions. In some embodiments, the combining information 728 communicates an equation used to perform the combining In some embodiments, the combining information includes or indicates a set of coefficients corresponding to a linear combination equation.

Drawing 706 illustrates a third approach in which combining information is obtained by using stored information 738 in combination with information communicated in a packet along with the combined information. Stored information 738 may be obtained via pre-configuration or via wireless signaling. Drawing 740 illustrates an exemplary packet corresponding to the third approach including a packet header portion 742 and a packet payload portion 744. The packet payload portion 744 conveys either a file portion 746 or a combination of file portions 750, depending upon the mode of device operation. When the packet payload portion 744 conveys a combination of file portions 750, the packet header portion 742 conveys part of the combining information 748 with the other portion of the combining information being included in stored information 738. The combining information is, e.g., information indicating which file portions are being combined and the method, e.g., function, used to combine the indicated file portions. In some embodiments, the combining information communicates an equation used to perform the combining. In some embodiments, the combining information includes or indicates a set of coefficients corresponding to a linear combination equation. In one exemplary embodiment, information 738 includes sets of equations and information 748 includes sets of coefficients corresponding to the sets of equations.

Figure 8:
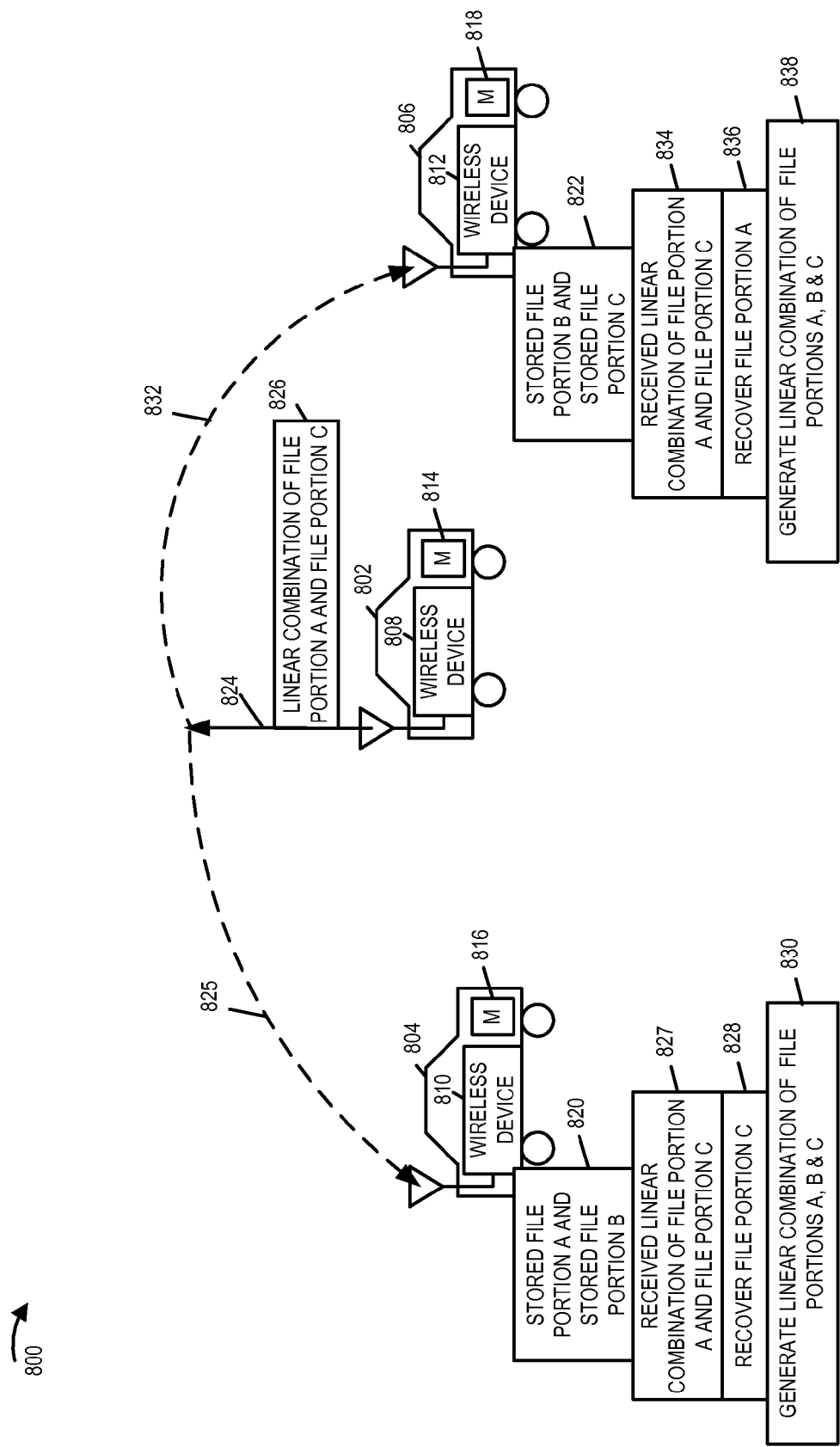
FIG. 8 illustrates a first part of an example in which wireless communications devices implement a method of communicating a file in accordance with an exemplary embodiment.
Figure 9:
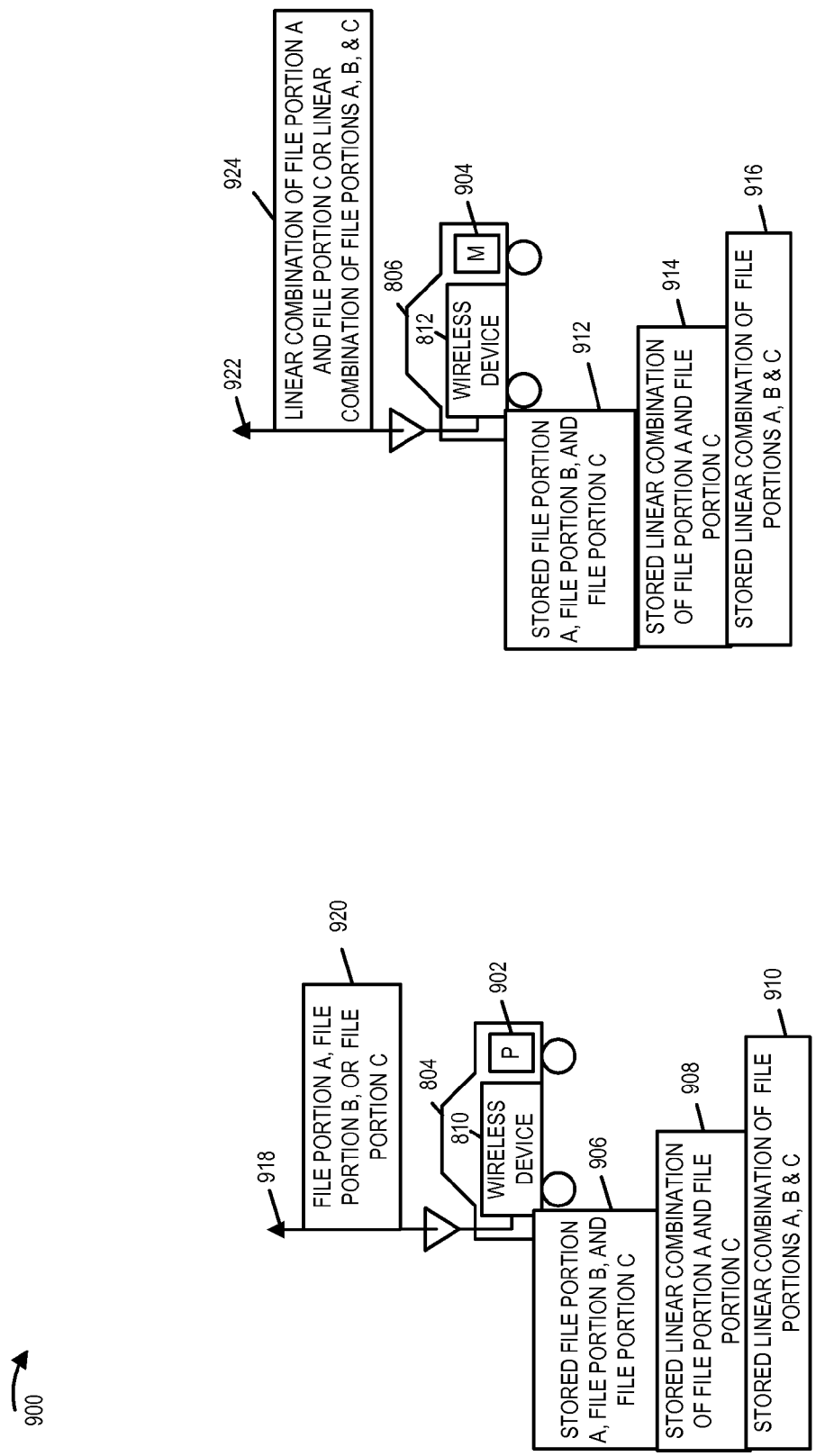
FIG. 9 illustrates a second part of an example in which wireless communications devices implement a method of communicating a file in accordance with an exemplary embodiment.
Figure 10:
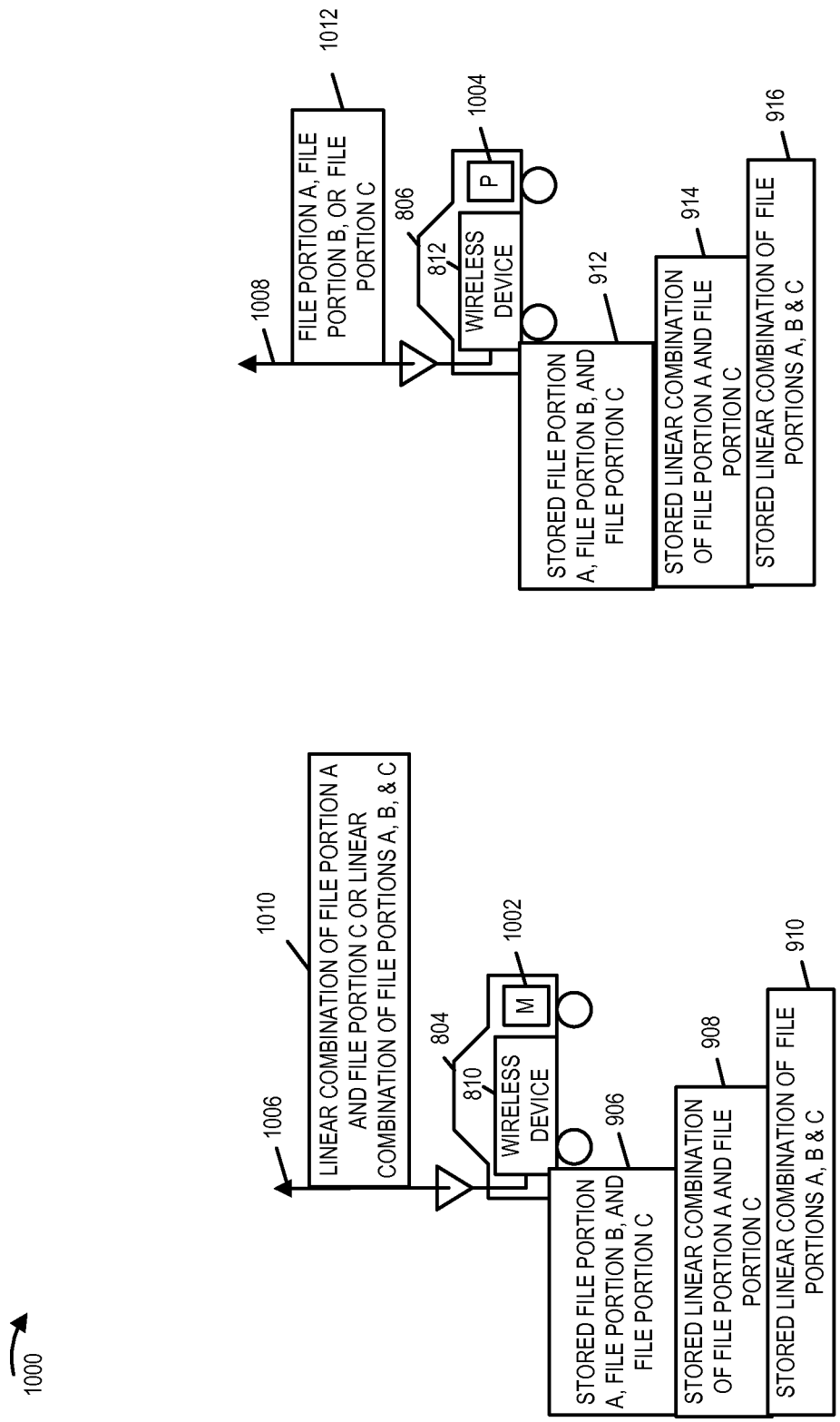
FIG. 10 illustrate a third part of an example in which wireless communications devices implement a method of communicating a file in accordance with an exemplary embodiment.

FIGS. 8-10 illustrate an example in which wireless communications devices (808, 810, 812) implement a method of communicating a file in accordance with an exemplary embodiment. Drawing 800 of FIG. 8 illustrates three exemplary vehicles (802, 804, 806) including wireless communications devices (808, 810, 812), respectively, at a first point in time. Each of the wireless communications devices (808, 810, 812) are moving, as indicated by "M" in blocks (814, 816, 818), respectively. In the example of FIGS. 8-10, a wireless communications device determines to be in a first mode of operation in which it transmits file portions when it is stationary and determines to be in a second mode of operation in which the wireless communications device transmits combinations of file portions when it is moving.

Wireless device 808 transmits signal 824 including a linear combination of file portion A and file portion C 826. The signal 824 is received by wireless communications device 810 as indicated by dotted line arrow 825. Wireless device 810 already includes stored file portion A and stored file portion B as indicated by block 820. Wireless communications device 810 successfully recovers and stores the received linear combination of file portion A and file portion C as indicated by block 827. Wireless communications device recovers file portion C, e.g., by solving for file portion C, as indicated by block 828. Wireless communications device 810 stores the recovered file portion C. Wireless communications device 810 generates one or more linear combinations of file portions using the recently received and/or recently recovered information. In this example, wireless communications device 810 generates a linear combination of file portion A, file portion B and file portion C, as indicated by block 830.

Signal 824 is also received by wireless communications device 812 as indicated by dotted line arrow 832. Wireless device 812 already includes stored file portion B and stored file portion C as indicated by block 822. Wireless communications device 812 successfully recovers and stores the received linear combination of file portion A and file portion C as indicated by block 834. Wireless communications device 812 recovers file portion A, e.g., by solving for file portion A, as indicated by block 836. Wireless communications device 812 stores the recovered file portion A. Wireless communications device 812 generates one or more linear combinations of file portions using the recently received and/or recently recovered information. In this example, wireless communications device 812 generates a linear combination of file portion A, file portion B and file portion C, as indicated by block 838.

FIG. 9 is a continuation of FIG. 8 which includes drawing 900 illustrating exemplary vehicles (804, 806) including wireless devices (810, 812) at a later time with respect to FIG. 8. Wireless device 810 is stationary as indicated by the "P" for parked in block 902, while wireless device 812 is moving as indicated by the "M" in block 904. Wireless device 810 includes stored file portion A, file portion B and file portion C as indicated by block 906. Wireless device 810 further includes stored linear combination for file portion A and file portion C as indicated by 908. Wireless device 810 further includes stored linear combination for file portion A, file portion B, and file portion C as indicated by block 910. Wireless communications device 810 determines to operate in the first mode of operation since it is stationary. Wireless communications device 810 transmits signal 918 communicating information 920 which includes one of file portion A, file portion B or file portion C in a transmitted packet. In some embodiments, wireless communications device 810 alternates, e.g., sequentially between transmitting different file portions which are currently stored in its memory.

Wireless device 812 includes stored file portion A, file portion B and file portion C as indicated by block 912. Wireless device 812 further includes stored linear combination for file portion A and file portion C as indicated by block 914. Wireless device 812 further includes stored linear combination for file portion A, file portion B, and file portion C as indicated by block 916. Wireless communications device 812 determines to operate in the second mode of operation since it is moving. Wireless communications device 812 transmits signal 922 communicating information 924 including a linear combination of file portion A and file portion C or a linear combination of file portions A, B and C transmitted packet.

FIG. 10 is a continuation of FIG. 9 which includes drawing 1000 illustrating exemplary vehicles (804, 806) including wireless devices (810, 812) at a later time with respect to FIG. 9. Wireless device 812 is stationary as indicated by the "P" for parked in block 1004, while wireless device 810 is moving as indicated by the "M" in block 1002. Wireless communications device 812 determines to operate in the first mode of operation since it is stationary. Wireless communications device 812 transmits signal 1008 communicating information 1012 including one of file portion A, file portion B or file portion C in a transmitted packet. In some embodiments, wireless communications device 812 alternates, e.g., sequentially between transmitting different file portions which are currently stored in its memory. Wireless communications device 810 transmits signal 1006 communicating information 1010 including a linear combination of file portion A and file portion C or a linear combination of file portions A, B, and C in a transmitted packet.

In some embodiments, a wireless communications device selects which one of a plurality of alternative file portions or alternative combinations of file portions to transmit based on received file portion and/or received file portion combination information from other wireless communications devices. For example, when in the first mode of operation, the wireless communications device selects and transmits the stored file portion that it considers to be the most likely to provide new information to the largest number of devices within its range, and when in the second mode of operation, the wireless communications device selects and transmits the stored file portion combination that it considers to be the most likely to provide new information to the largest number of devices within its range.

In some embodiments, the wireless communications, when in the first mode of operation, transmits sequentially each of its stored file portions. In some embodiments, the wireless communications, when in the second mode of operation, transmits sequentially each of its stored different combinations of file portions.

In various embodiments a device, e.g., a mobile wireless device in system 100 of FIG. 1, and/or a wireless device 300 of FIG. 3, and/or a wireless device of system 500 of FIG. 5, and/or a wireless device of FIGS. 8-10, and/or one of the wireless devices of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the wireless communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless device to communicate a file, comprising:
    determining if the wireless device is to operate in a first mode of communication operation in which received portions of said file are transmitted or else a second mode of communication operation in which combinations of portions of said file are transmitted, said determining being based on whether said wireless device is in motion or whether the wireless device is located in a geographic region in which distribution of transmitted packets between nodes occurs in accordance with a known distribution pattern, at least one of said combinations of file portions including fewer bits than a number of input bits used to generate said at least one combination of file portions; and
    transmitting packets communicating received file portions when it is determined that the wireless device is to operate in said first mode of operation; and
    transmitting packets communicating combinations of file portions when it is determined that the wireless device is to operate in said second mode of operation.

2. The method of claim 1, wherein determining if the wireless device is to operate in the first mode of communication operation or else the second mode of communication operation is based on whether said wireless device is in motion and further includes:
    determining a mode of operation based on a speed of wireless device motion.

3. The method of claim 2, wherein determining if the wireless device is to operate in the first mode of communication operation or else the second mode of communication operation includes:
    selecting said first mode of operation when said wireless device is stationary or at a geographic location wherein distribution of transmitted packets between nodes occurs in accordance with the known distribution pattern; and
    selecting said second mode of operation when said wireless device is moving and said wireless device is not at a geographic location wherein distribution of transmitted packets between nodes occurs in accordance with the known distribution pattern.

4. The method of claim 2,
    wherein transmitting packets communicating combinations of file portions when it is determined that the wireless device is to operate in said second mode of operation includes:
    transmitting packets communicating different combinations of file portions.

5. The method of claim 4, further comprising:
    prior to said transmitting packets communicating different combinations of file portions:
    generating at least one linear combination of file portions from different file portions which were included in different received packets.

6. The method of claim 4, further comprising:
    prior to said transmitting packets communicating different combinations of file portions:
    generating at least one linear combination of file portions from a file portion included in a first received packet and a file portion which is a linear combination included in a second received packet.

7. The method of claim 1, wherein said step of determining is based on stored map information indicating different non-overlapping geographic regions.

8. The method of claim 4, further comprising:
    processing combinations included in received packets to generate a complete set of content included in said file.

9. The method of claim 8, wherein processing combinations included in received packets to generate a complete set of content included in said file includes:
    using a file portion communicated in a received packet in combination with combinations included in other received packets to generate said complete set of content.

10. The method of claim 9, wherein said content is one of audio content, video content, or a combination of audio and video content.

11. A wireless device comprising:
    means for determining if the wireless device is to operate in a first mode of communication operation in which received portions of a file are transmitted or else a second mode of communication operation in which combinations of portions of said file are transmitted, said means for determining being based on whether said wireless device is in motion or whether the wireless device is located in a geographic region in which distribution of transmitted packets between nodes occurs in accordance with a known distribution pattern, at least one of said combinations of file portions including fewer bits than a number of input bits used to generate said at least one combination of file portions; and
    means for transmitting packets communicating received file portions when it is determined that the wireless device is to operate in said first mode of operation; and
    means for transmitting packets communicating combinations of file portions when it is determined that the wireless device is to operate in said second mode of operation.

12. A computer program product for use in wireless device, the computer program product comprising:
    a non-transitory computer readable medium comprising:
    code for causing at least one computer to determine if the wireless device is to operate in a first mode of communication operation in which received portions of a file are transmitted or else a second mode of communication operation in which combinations of portions of said file are transmitted, said code including code for causing the at least one computer to determine mode of operation of the wireless device based on whether said wireless device is in motion or whether the wireless device is located in a geographic region in which distribution of transmitted packets between nodes occurs in accordance with a known distribution pattern, at least one of said combinations of file portions including fewer bits than a number of input bits used to generate said at least one combination of file portions; and code for causing said at least one computer to transmit packets communicating received file portions when it is determined that the wireless device is to operate in said first mode of operation; and code for causing said at least one computer to transmit packets communicating combinations of file portions when it is determined that the wireless device is to operate in said second mode of operation.

13. A wireless device comprising:

at least one processor configured to:

determine if the wireless device is to operate in a first mode of communication operation in which received portions of a file are transmitted or else a second mode of communication operation in which combinations of portions of said file are transmitted, said processor being configured to determine mode of operation of the wireless device based on whether said wireless device is in motion or whether the wireless device is located in a geographic region in which distribution of transmitted packets between nodes occurs in accordance with a known distribution pattern, at least one of said combinations of file portions including fewer bits than a number of input bits used to generate said at least one combination of file portions; and transmit packets communicating received file portions when it is determined that the wireless device is to operate in said first mode of operation; and transmit packets communicating combinations of file portions when it is determined that the wireless device is to operate in said second mode of operation; and memory coupled to said at least one processor.

14. The wireless device of claim 13, wherein said at least one processor is configured to determine the mode of operation based on whether said wireless device is in motion and based on a speed of wireless device motion, as part of being configured to determine if the wireless device is to operate in the first mode of communication operation or else the second mode of communication operation.

15. The wireless device of claim 14, wherein said at least one processor is configured to select said first mode of operation when said wireless device is stationary or at a geographic location wherein distribution of transmitted packets between nodes occurs in accordance with the known distribution pattern; and select said second mode of operation when said wireless device is moving and said wireless device is not at a geographic location wherein distribution of transmitted packets between nodes occurs in accordance with the known distribution pattern, as part of being configured to determine if the wireless device is to operate in the first mode of communication operation or else the second mode of communication operation.

16. The wireless device of claim 14, wherein said at least one processor is configured to transmit packets communicating different combinations of file portions, as part of being configured to transmit packets communicating combinations of file portions when it is determined that the wireless device is to operate in said second mode of operation.

* * * * *